US006947357B2

(12) United States Patent
Otsuki

(10) Patent No.: US 6,947,357 B2
(45) Date of Patent: Sep. 20, 2005

(54) CHANGER-TYPE DISK DEVICE

(75) Inventor: Akira Otsuki, Iwaki (JP)

(73) Assignee: Alpine Electronics, Inc., Tokyo (JP)

( * ) Notice: Subject to any disclaimer, the term of this patent is extended or adjusted under 35 U.S.C. 154(b) by 274 days.

(21) Appl. No.: 10/287,453

(22) Filed: Nov. 4, 2002

(65) Prior Publication Data

US 2003/0112718 A1 Jun. 19, 2003

(30) Foreign Application Priority Data

Nov. 6, 2001 (JP) ....................................... 2001-340997

(51) Int. Cl.[7] .......................... G11B 7/085; G11B 21/08

(52) U.S. Cl. ............................... 369/30.77; 369/30.85; 369/30.89

(58) Field of Search ................................. 720/639, 657; 369/30.41, 30.49, 30.52, 30.61, 30.66, 30.77, 30.78, 30.84, 30.85, 30.89

(56) References Cited

U.S. PATENT DOCUMENTS

| | | | | |
|---|---|---|---|---|
| 4,701,900 A | * 10/1987 | Hasegawa et al. | ....... | 369/30.84 |
| 5,459,703 A | 10/1995 | Tanaka | | |
| 5,930,223 A | 7/1999 | Toyama et al. | | |
| 6,031,811 A | * 2/2000 | Umesaki et al. | ......... | 369/30.92 |
| 6,097,693 A | 8/2000 | Nakamichi | | |
| 6,496,471 B1 | * 12/2002 | Sato et al. | .................. | 369/192 |

FOREIGN PATENT DOCUMENTS

| | | |
|---|---|---|
| EP | 0 856 842 A2 | 8/1998 |
| EP | 1 033 710 A1 | 9/2000 |
| WO | WO 01/88913 A1 | 11/2001 |

* cited by examiner

*Primary Examiner*—Brian E. Miller
(74) *Attorney, Agent, or Firm*—Brinks Hofer Gilson & Lione

(57) ABSTRACT

A changer-type disk device includes a disk storage section holding disks arranged in the axial direction of the disks; a drive unit for reproducing and/or recording information from/in a disk selected from the disks in the disk storage section; a drive activating mechanism for moving the drive unit back and forth between a drive position where the selected disk is driven and a retracted position where no disk is driven; and pressing members. The pressing members come into pressure contact with the circumferential edges of the waiting disks held in the disk storage section to push them toward the disk storage section from the outside in the radial direction, and are separated therefrom when the drive unit is moved from the drive position to the retracted position. Accordingly, the waiting disks can be locked in the radial direction; thus, a rattle noise occurring from the waiting disks during driving of the selected disk can be reduced.

20 Claims, 21 Drawing Sheets

CHANGER-TYPE DISK DEVICE

BACKGROUND OF THE INVENTION

1. Field of the Invention

The present invention relates to a changer-type disk device capable of reproducing and/or recording information in a CD (compact disk) or a DVD (digital versatile disk) and accommodating a plurality of disks in the device, and more particularly to a slot-in changer-type disk device for automatically transferring a disk inserted through a loading slot.

2. Description of the Related Art

Automobile changer-type disk devices often use a slot-in system for automatically transferring a disk inserted through a loading slot with a disk transfer mechanism. Such changer-type disk devices include a drive unit for reproducing and/or recording information by optical pickup by driving the rotation of the disk and a disk storage section capable of storing a plurality of disks side-by-side in the axial direction of the disks. The drive unit is moved back and forth between the drive position and the retracted position by a drive activating mechanism. One of a plurality of disks held in the disk storage section is selectively taken out in the drive position, and rotated by the drive unit.

Changer-type disk devices are well known in which a plurality of stockers is arranged so as to be freely moved up and down as the disk storage section. Such a disk storage section includes arch-shaped stockers each capable of holding the circumferential edge of a disk about halfway around and a plurality of lead screws each having a spiral groove with an irregular pitch. The lead screws are inserted and screwed into the plurality of stockers, arranged in layers, and are rotated synchronously, thereby allowing the stockers (each holding a disk) to be moved up and down in the axial direction of the lead screws.

For example, when a disk inserted into the device is held in a desired stocker, the stocker is positioned at the same height as the transfer path of the disk. Thereafter, the disk is carried to the back of the device by the disk transfer mechanism, so that the disk can be held by the inner periphery of the corresponding stocker. When a selected disk held in a desired stocker is taken out to a play position, the stocker is positioned at the same height as the transfer path of the disk. Thereafter, the selected disk held in the stocker is transferred toward the front of the device, and the selected disk can be removed from the inner periphery of the stocker and clamped in the drive unit. The inner periphery of the stocker has an arch-shaped lock groove into which the circumferential edge of the disk can be inserted about halfway around, by which the disk can be held in a state in which the disk is locked in position in its axial and radial directions.

Because the conventional changer-type disk device described above is constructed such that the stocker is moved up and down while the drive unit is positioned in its retracted position, and the drive unit can overlap with the disk held in the stocker in the drive position, the space in the device can be used effectively, thus reducing the size. However, the stocker is moved up and down while being fitted in the spiral groove of the lead screw, so that a minute clearance is required between the stocker and the spiral groove. Also, since the disk held in the stocker can vary in its manufacturing dimensions, the inside diameter of the stocker-holding groove must be set to a dimension at which a disk of a possible maximum diameter can be inserted. Furthermore, in the slot-in changer-type disk device, since an obstacle cannot intrude on the disk-transfer path from the loading slot to the stocker, the stocker-holding groove can only be provided about halfway around the disk (about 180°). Therefore, it is difficult for the stocker to hold the disk securely. For those reasons, if external vibrations from the vehicle are applied to the changer-type disk device when a desired selected disk is taken out of the stocker and driven, the other waiting disks remaining in the stockers may vibrate to cause a rattle noise. Particularly, when music recorded in the disk is played back, such a rattle noise is extremely grating to the listener.

SUMMARY OF THE INVENTION

Accordingly, the present invention is made in consideration of the circumstances of the conventional art, and the object is to provide a changer-type disk device capable of reducing a rattle noise occurring during the recording/playback operations.

A changer-type disk device according to the present invention comprises a disk storage section holding a plurality of disks arranged in their axial direction; a drive unit for reproducing and/or recording information from/in a disk selected from the disks in the disk storage section; a drive activating mechanism for moving the drive unit back and forth between a drive position where the selected disk is driven and a retracted position where no disk is driven; and pressing members. The pressing members are brought into pressure contact with the circumferential edges of waiting disks other than the selected disk, which are held in the disk storage section, to press the waiting disks toward said disk storage section from the outside in the radial direction when the drive unit is moved to the drive position, and are separated from the circumferential edges of the waiting disks with the motion of the drive activating mechanism when the drive unit is moved from the drive position to the retracted position.

Alternately, there is also provided a changer-type disk device comprising a casing; a face member having a loading slot through which disks are loaded to and ejected from the casing; a disk storage section arranged at the back of the casing for holding a plurality of disks arranged in the axial direction of the disks; a disk transfer mechanism for transferring the disks between the loading slot and the disk storage section; a drive unit movably arranged between the face member and the disk storage section for reproducing and/or recording information from/in a selected disk taken from the disk storage section by the disk transfer mechanism; a drive activating mechanism for moving the drive unit back and forth between a drive position where the selected disk taken out to the play position and a retracted position where no disk is driven; and pressing members. The pressing members are brought into pressure contact with the circumferential edges of waiting disks other than the selected disk, which are held in the disk storage section, to press the waiting disks toward the disk storage section from the outside in the radial direction when the drive unit is moved to the drive position, and are separated from the circumferential edges of the waiting disks with the motion of the drive activating mechanism when the drive unit is moved from the drive position to the retracted position.

In the changer-type disk device as constructed above, when the drive unit is moved to the drive position by the drive activating mechanism and the disk selected from the plurality of disks held in the disk storage section is driven, the pressing members are brought into pressure contact with the circumferential edges of the waiting disks left in the disk storage section. Accordingly, the rattle noise occurring from the waiting disks can be reduced. When the drive unit is moved to the retracted position, the pressing members are separated from the circumferential edges of the waiting disks in synchronism with the motion of the drive activating mechanism. Therefore, when the disk is inserted in the disk storage section or when the disk housed in the disk storage section is selected, the pressing members do not interfere with the motion of the disk.

With such a structure, preferably, a plurality of tapered grooves is formed in the face of each pressing member which faces the circumferential edges of the waiting disks, so that when the drive unit is moved to the drive position, the waiting disks are locked in position in the axial direction of the disks by bringing the tapered grooves into pressure contact with the circumferential edges of the waiting disks left in the disk storage section. Providing such tapered grooves in the pressing members allows the waiting disks left in the disk storage section to be locked in position both in the radial direction and in the axial direction; consequently, the rattle noise can be reduced more effectively.

DESCRIPTION OF THE PREFERRED EMBODIMENT

An embodiment of the present invention will be described with reference to the drawings.

A changer-type disk device according to this embodiment is a slot-in disk playback device capable of playing back a disk D (small-diameter disk) having an external diameter of 8 cm and a disk D (large-diameter disk) having an external diameter of 12 cm, housing a plurality of the large-diameter disks D, and selectively playing back one of the disks D.

Figure 1:
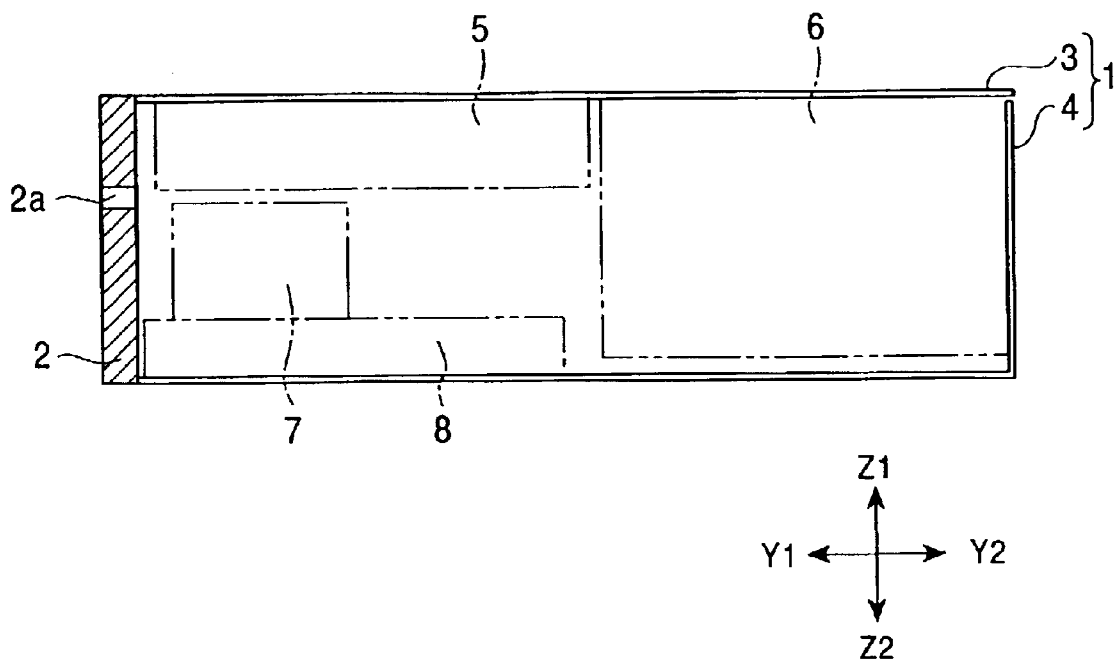
FIG. 1 is a simplified sectional view of the internal mechanism of a changer-type disk device according to an embodiment of the present invention.

Referring to FIG. 1, the changer-type disk device includes a casing 1 shaped like a box and a face member 2 arranged on the front of the casing 1 (in the direction of Y1). The face member 2 has a loading slot 2*a* extending in the direction of X1 to X2. The loading slot 2*a* can be opened and closed by a door member (not shown), through which a disk D is inserted into and ejected from the casing 1 one by one. The casing 1 is constituted by a first chassis 3 and a second chassis 4, which are joined together using a plurality of screws. The upper first chassis 3 includes a disk transfer mechanism 5 and a disk storage section 6 arranged at the rear of the casing 1. The lower second chassis 4 includes a drive unit 7 and a drive activating mechanism 8. The drive unit 7 can be moved back and forth between the drive position in the casing 1 and the retracted position near the loading slot 2*a* by the drive activating mechanism 8, as will be described later.

Figure 2:
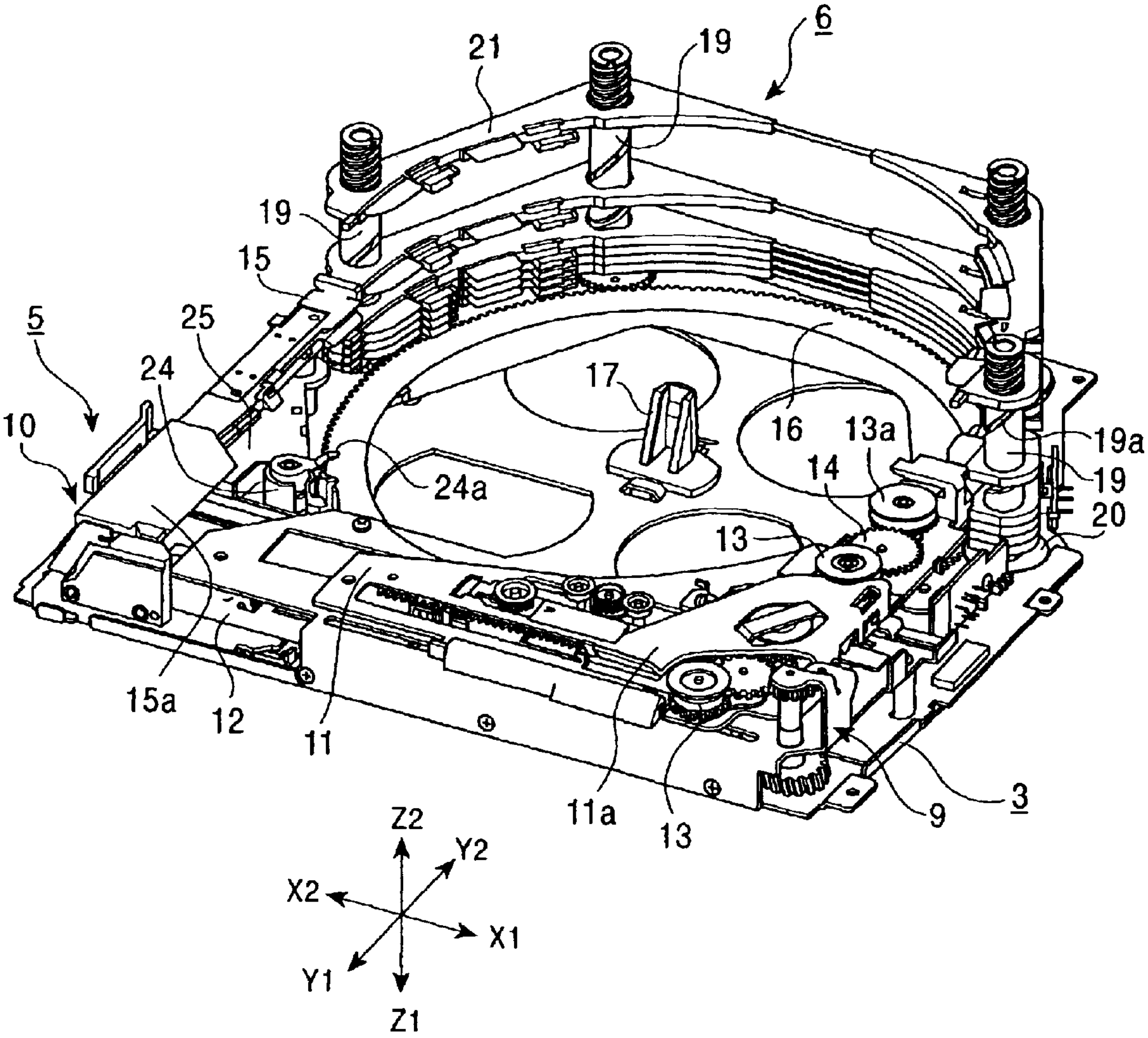
FIG. 2 is a perspective view showing the internal mechanism of a first chassis, seen from the bottom.
Figure 3:
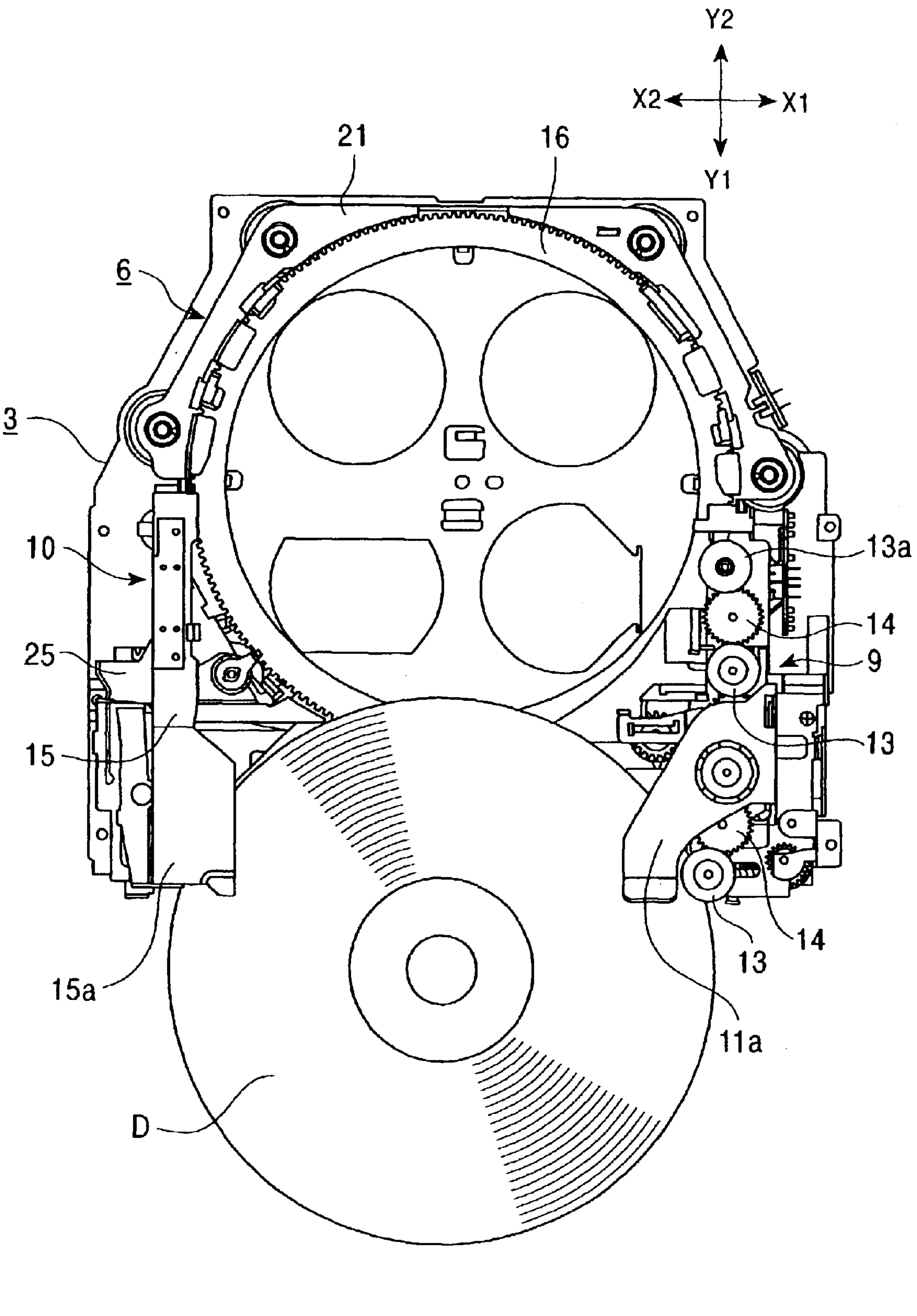
FIG. 3 is a bottom view showing a state in which disk loading is started.

The first chassis 3 is shown upside down in FIG. 2, wherein the disk transfer mechanism 5 includes first and second guides 9 and 10, which can be slid perpendicular (in the direction of X1 to X2) to the transferring direction of the disk D (in the direction of Y1 to Y2), as shown in the drawing. The distance between the guides 9 and 10 can be varied depending on a guide-distance changing mechanism constituted by a first motor (not shown), first and second slide plates 11 and 12, and so on.

Referring to FIGS. 2 to 12, the first guide 9 includes a plurality of transfer pulleys 13 each having a groove into which the circumferential edge of the disk D is inserted and a plurality of drive gears 14 for applying a driving force to the transfer pulleys 13. The drive gears 14 are driven to rotate using the first motor as a drive source. While the transfer pulleys 13 and the drive gears 14 are arranged in line and journaled on the first slide plate 11, only the support shaft of an innermost transfer pulley (denoted by numeral 13*a*) can be rotated with respect to the first slide plate 11 around the rotation axis of the drive gear 14 engageable with the transfer pulley 13*a*. The first slide plate 11 has a first receiving section 11*a*, which is set approximately as high as the lower end (an end on the Z2 side) of each transfer pulley 13. On the other hand, the second guide 10 includes a long transfer guide 15, which has a guide groove extending linearly along the transferring direction of the disk D. The transfer guide 15 is secured to the second slide plate 12, under which (on an end face on the Z2 side) a second receiving section 15*a* set substantially as high as the first receiving section 11*a* is formed. As described above, the first and second guides 9 and 10, transfer pulleys 13 (13*a*) and the drive gears 14 provided for the first guide 9, the transfer guide 15 provided for the second guide 10, and the first and second slide plates 11 and 12 constitute a disk transfer mechanism 5 for transferring a disk D between the loading slot 2*a* and the disk storage section 6 and taking out a disk D selected from the plurality of disks D held in the disk storage section 6 to a play position.

The first and second guides 9 and 10 sandwich the disk D between the transfer pulleys 13 and the transfer guide 15 in the direction (the direction of X1 to X2) perpendicular to the thickness of the disk D, and a driving force transmitted from the drive gears 14 to the transfer pulleys 13 is applied to the disk D, thereby transferring the disk D between the loading slot 2*a* and the play position, and between the play position and the disk storage section 6. Also, since the transfer pulleys 13 and the transfer guide 15 can be brought closer together or separated from each other by sliding the first and second slide plates 11 and 12, either the small-diameter disk D or the large-diameter disk D can be transferred. Furthermore, as clearly shown in FIG. 3, since the first and second receiving sections 11*a* and 15*a* are set substantially as high as the lower end of each transfer pulley 13, the disk D is prevented from dropping down between the transfer pulleys 13 and the transfer guide 15 unintentionally when the disk D is loaded or ejected.

Figure 7:
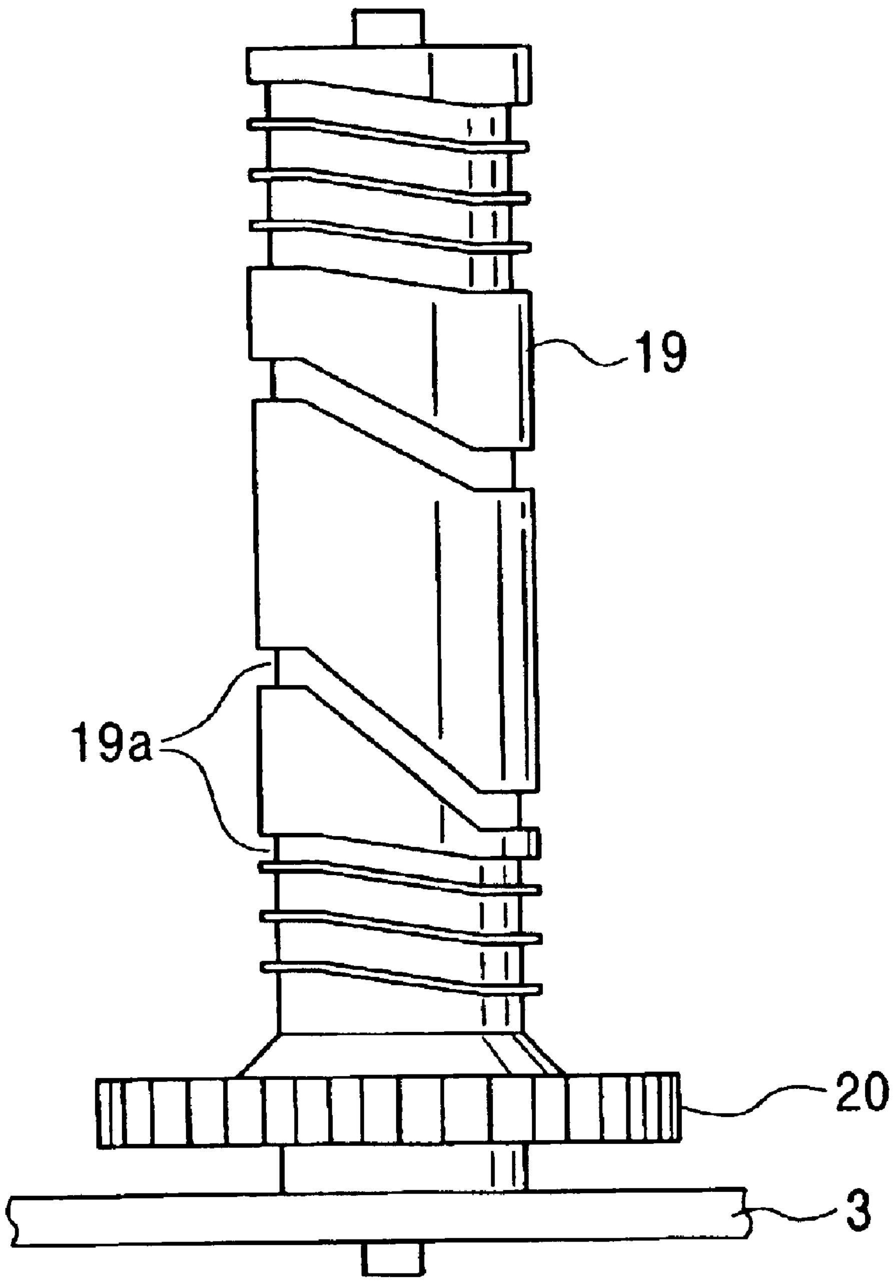
FIG. 7 is a side view of a lead screw.

Returning to FIG. 2, the disk storage section 6 will be specifically described. A ring-shaped large-diameter gear 16 is disposed on the top (the bottom in FIG. 2) of the first chassis 3, and an upper locking member 17 is secured onto the center of the large-diameter gear 16. The large-diameter gear 16 is driven to rotate with a second motor (not shown) separate from the first motor as a drive source, and the amount and direction of the rotation of the large-diameter gear 16 are determined by a sensor 18 including an encoder rotating in engagement with the large-diameter gear 16 (refer to FIG. 11). Four lead screws 19 are disposed on the outside of the large-diameter gear 16. As shown in FIG. 7, each of the lead screws 19 has a small gear 20 secured thereto. The small gears 20 are in engagement with the large-diameter gear 16. Therefore, when the large-diameter gear 16 is rotated forwardly or backwardly, all of the four lead screws 19 are synchronously rotated in the same direction. Each lead screw 19 has an irregular-pitch spiral groove 19*a* cut therein. The spiral groove 19*a* has a regular, small pitch at the upper and lower ends, but has a large pitch at the center. The large-diameter gear 16, the lead screws 19, and the small gears 20 constitute a stocker drive mechanism for moving stockers 21, which will be described later, up and down in the axial direction of the lead screws 19.

Figure 8:
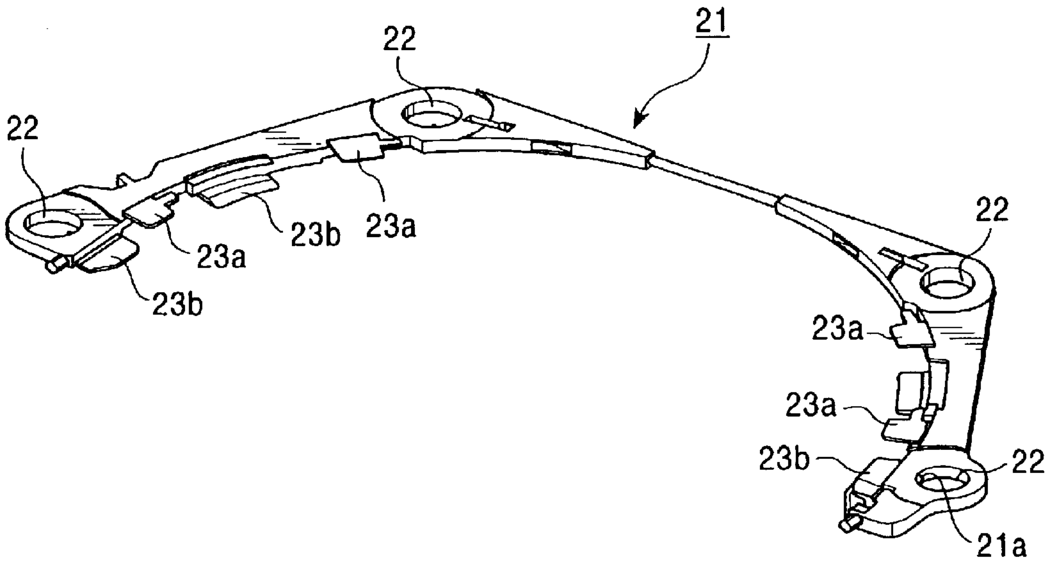
FIG. 8 is a perspective view of a stocker.

Holes 22 of a plurality of stockers 21 (six in this embodiment) are fitted on the respective lead screws 19. The stockers 21 are each shaped generally like an arch, as shown in FIG. 8. Each stocker 21 has four holes 22 each having a projection 21*a* therein. The projection 21*a* is slidably fitted in the spiral groove 19*a* of the lead screw 19. Thus, when the lead screws 19 are rotated synchronously by the large-diameter gear 16, the stockers 21 move up and down in the axial direction of the lead screws 19. The stocker drive mechanism and the stockers 21 constitute the disk storage section 6 described above, wherein a plurality of upper support pieces 23*a* and lower support pieces 23*b* are arranged on the semicircular-arch-shaped inner periphery of each stocker 21 such that they project toward the center. The upper support pieces 23*a* and the lower support pieces 23*b* are displaced in the direction of the thickness of the stocker 21, and the space between the upper support pieces 23*a* and the lower support pieces 23*b* functions as a retaining groove for retaining the disk D. Approximately half of the circumferential edge of the disk D is held between the upper support pieces 23*a* and the lower support pieces 23*b*.

Figure 6:
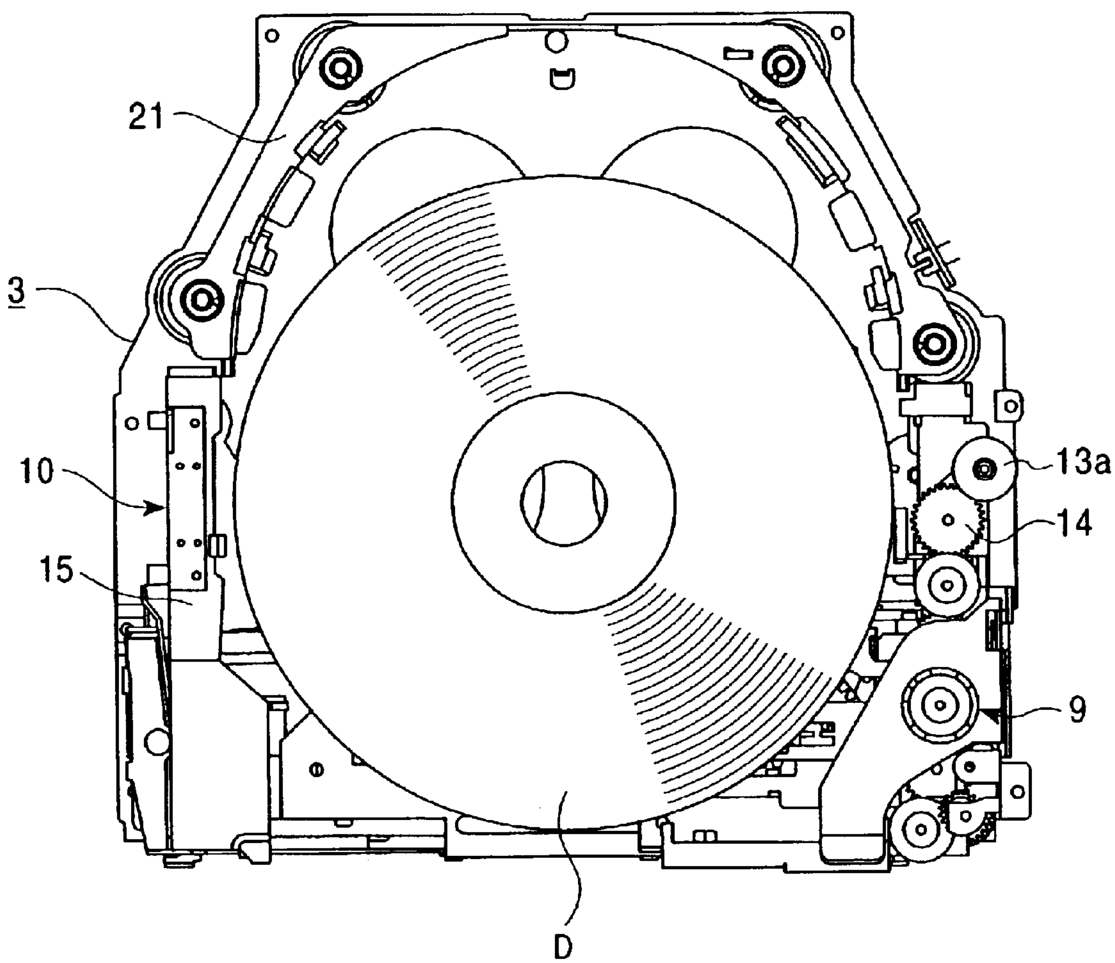
FIG. 6 is a bottom view showing a state in which the disk is being played.

Returning again to FIG. 2, the first chassis 3 has a buffer member 24 and a first pressing member 25 arranged close to each other on the top. The buffer member 24 is in engagement with the large-diameter gear 16. The buffer member 24 has a projection 24*a*, which is rotated slightly above the transfer path of the disk D in synchronization with the rotation of the large-diameter gear 16. As shown in FIG. 6, when a desired disk D is taken out to the play position, the projection 24*a* stops above the disk D, so that the disk D during playing operation and the disks D held in the stockers 21 above there do not come together.

Figure 9:
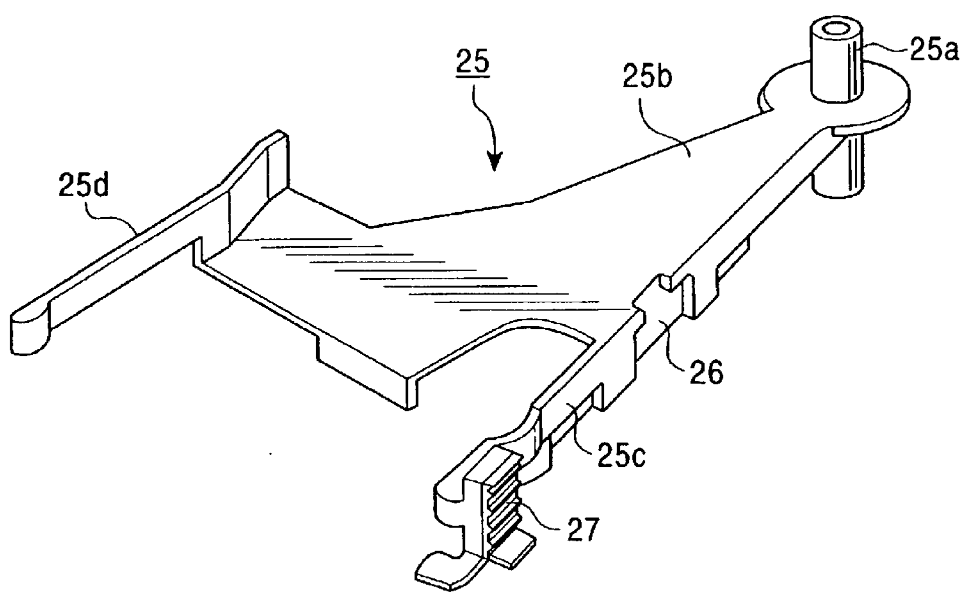
FIG. 9 is a perspective view of a first pressing member.
Figure 10A:
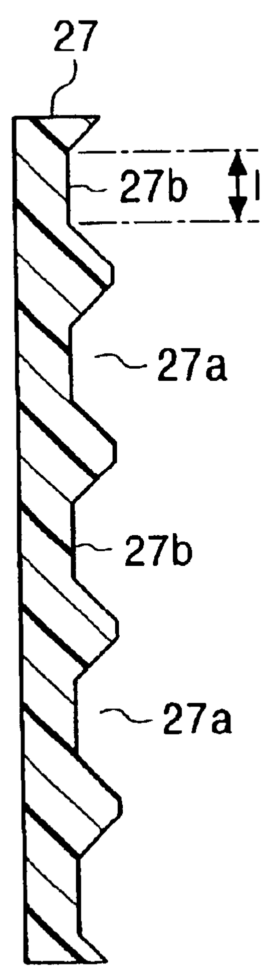
FIGS. 10A and 10B show a holding plate, FIG. 10A being a sectional view thereof and FIG. 10B being a front view thereof.
Figure 10B:
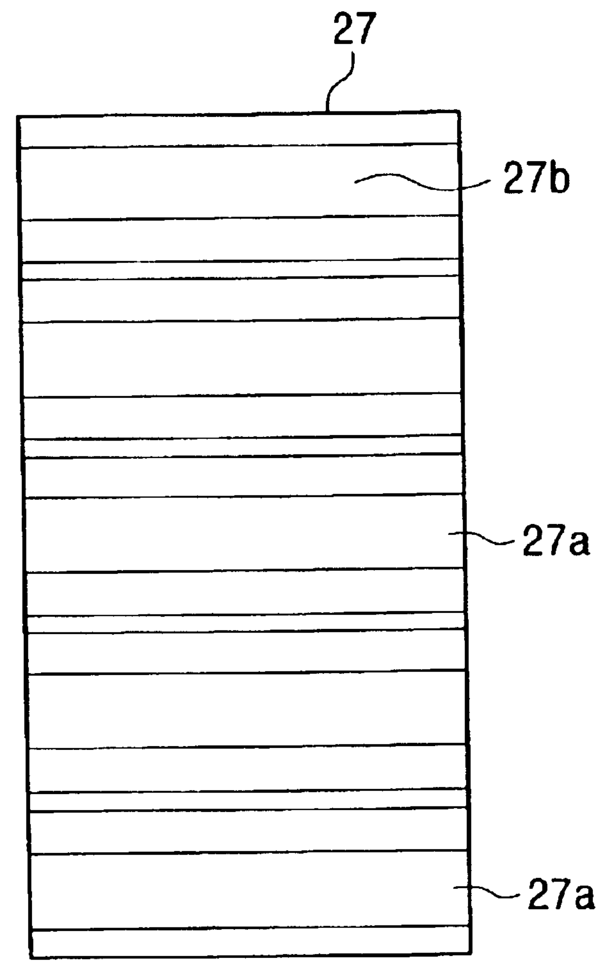

Referring to FIG. 9, the first pressing member 25 includes a support shaft 25*a* journaled on the first chassis 3, a planar portion 25*b* extending along the top of the support shaft 25*a* from the support shaft 25*a*, a pressing section 25*c* extending in the opposite direction to the support shaft 25*a* from one side of the planar portion 25*b*, and an activating section 25*d* extending in the opposite direction to the support shaft 25*a* from the other side of the planar portion 25*b*, which are integrally formed of a flexible synthetic resin. A leaf spring 26 is assembled with the thin pressing section 25*c*, so that by adding a spring force of the leaf spring 26 to an elastic force due to the flexibility of the pressing section 25*c* itself, the pressing section 25*c* is given sufficient flexibility. A lock plate 27 made of a relatively soft rubber material or the like is secured to the free end of the pressing section 25*c* using a double-faced adhesive tape or the like., A plurality of tapered grooves 27*a* is formed in the lock plate 27, as shown in FIGS. 10A and 10B. The distance between the tapered grooves 27*a* is set the same as the regular pitch at the upper and lower ends of the spiral grooves 19*a*, the number of which is fewer than that of the stockers 21 by one (five in this embodiment). The width I of a planar surface 27*b* at the bottom of each tapered groove 27*a* is set slightly smaller than the thickness of the disk D.

Figure 11:
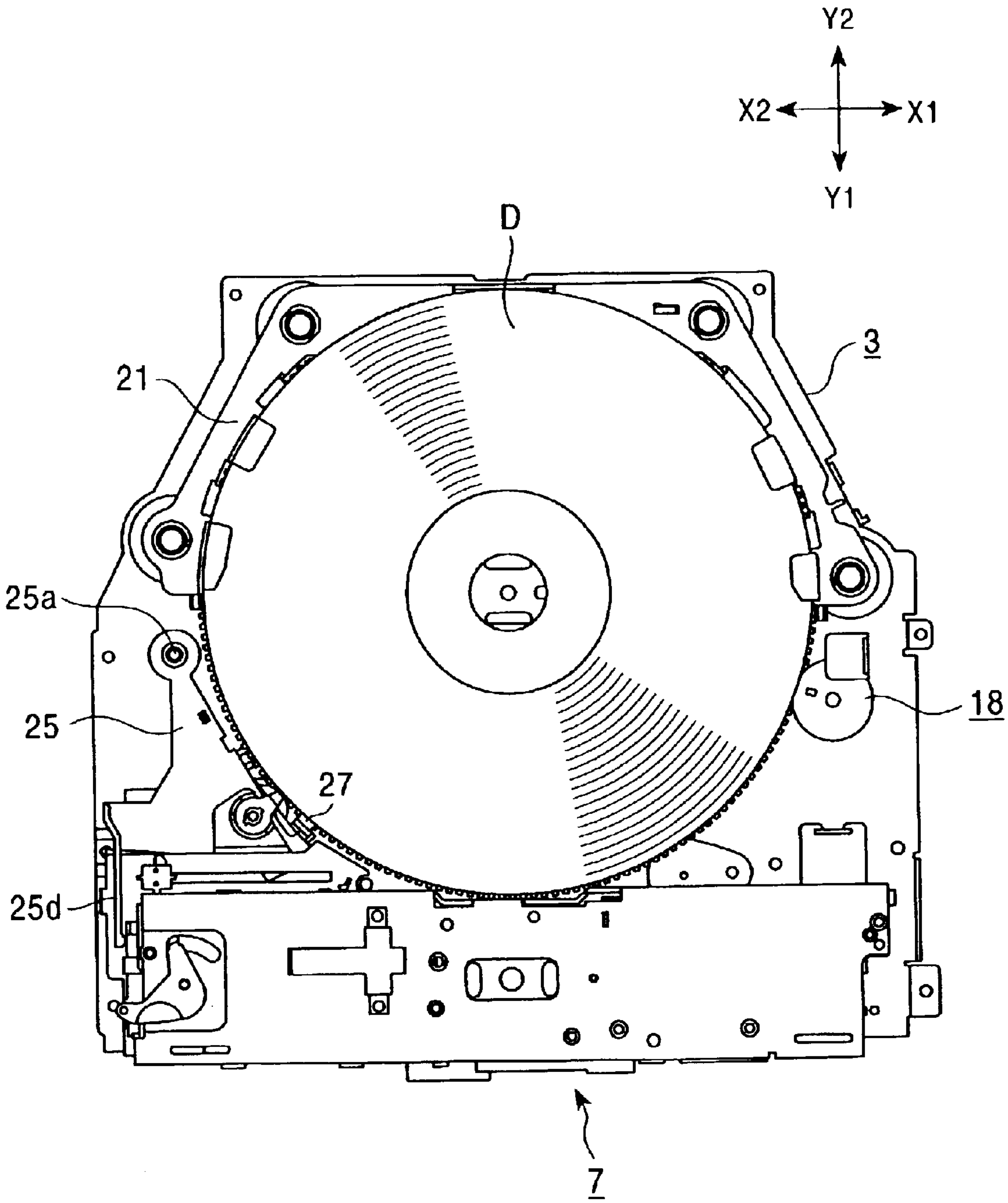
FIG. 11 is a bottom view showing the retracted position of a drive unit.
Figure 12:
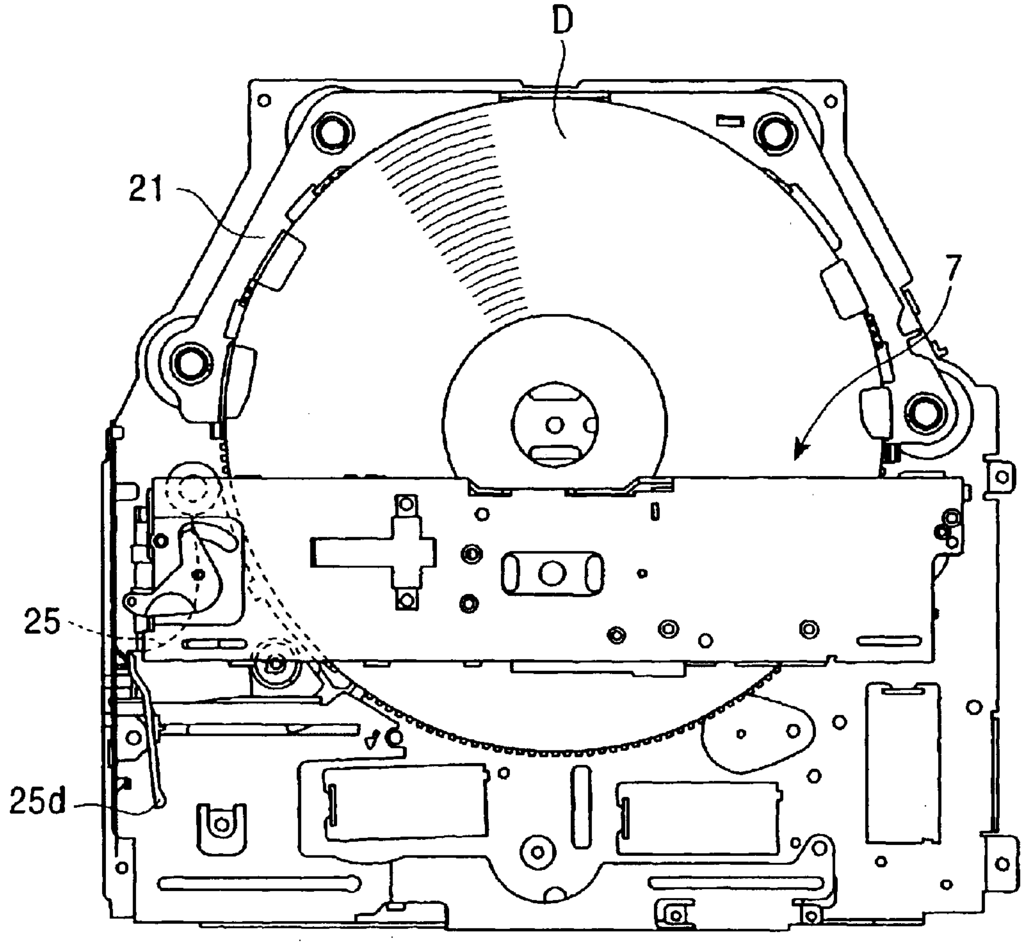
FIG. 12 is a bottom view showing the drive position of the drive unit.

The first pressing member 25 constructed as described above is rotated around the support shaft 25*a* in engagement with the component of the drive activating mechanism 8 when the drive activating mechanism 8 moves the drive unit 7 back and forth between the retracted position and the drive position. The rotating operation will be described later. When the drive unit 7 is in the retracted position where no disks are driven, as shown in FIG. 11, the first pressing member 25 is slightly rotated clockwise in the drawing, and the lock plate 27 is spaced apart from the circumferential edges of the disks D held in the stockers 21 (refer to FIG. 13). On the other hand, when the drive unit 7 is moved to the drive position, as shown in FIG. 12, the first pressing member 25 is slightly rotated counterclockwise in the drawing, and the lock plate 27 is brought into pressure contact with the circumferential edges of the disks D above the transfer path of the disk D (refer to FIG. 14). Accordingly, when a desired selected disk D is taken out to the play position, each of the waiting disks D positioned above the selected disk D in the axial direction of the disks receives a spring force of the pressing section 25*c* of the first pressing member 25 and the leaf spring 26 to be biased toward the respective stockers 21 from the outside in the radial direction, thereby reducing rattle noise generated by the vibration of the disk D.

Figure 15:
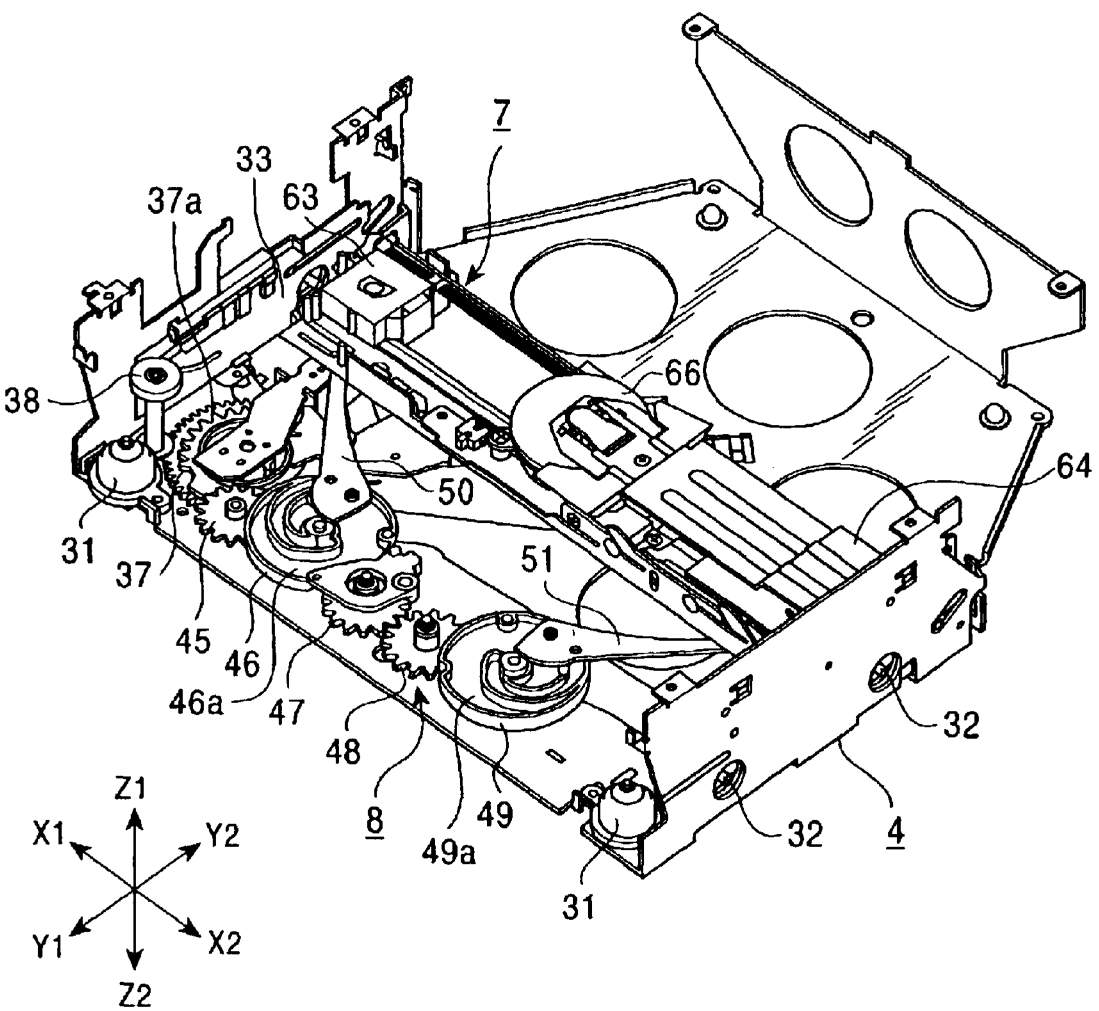
FIG. 15 is a perspective view of the internal mechanism of a second chassis.
Figure 16:
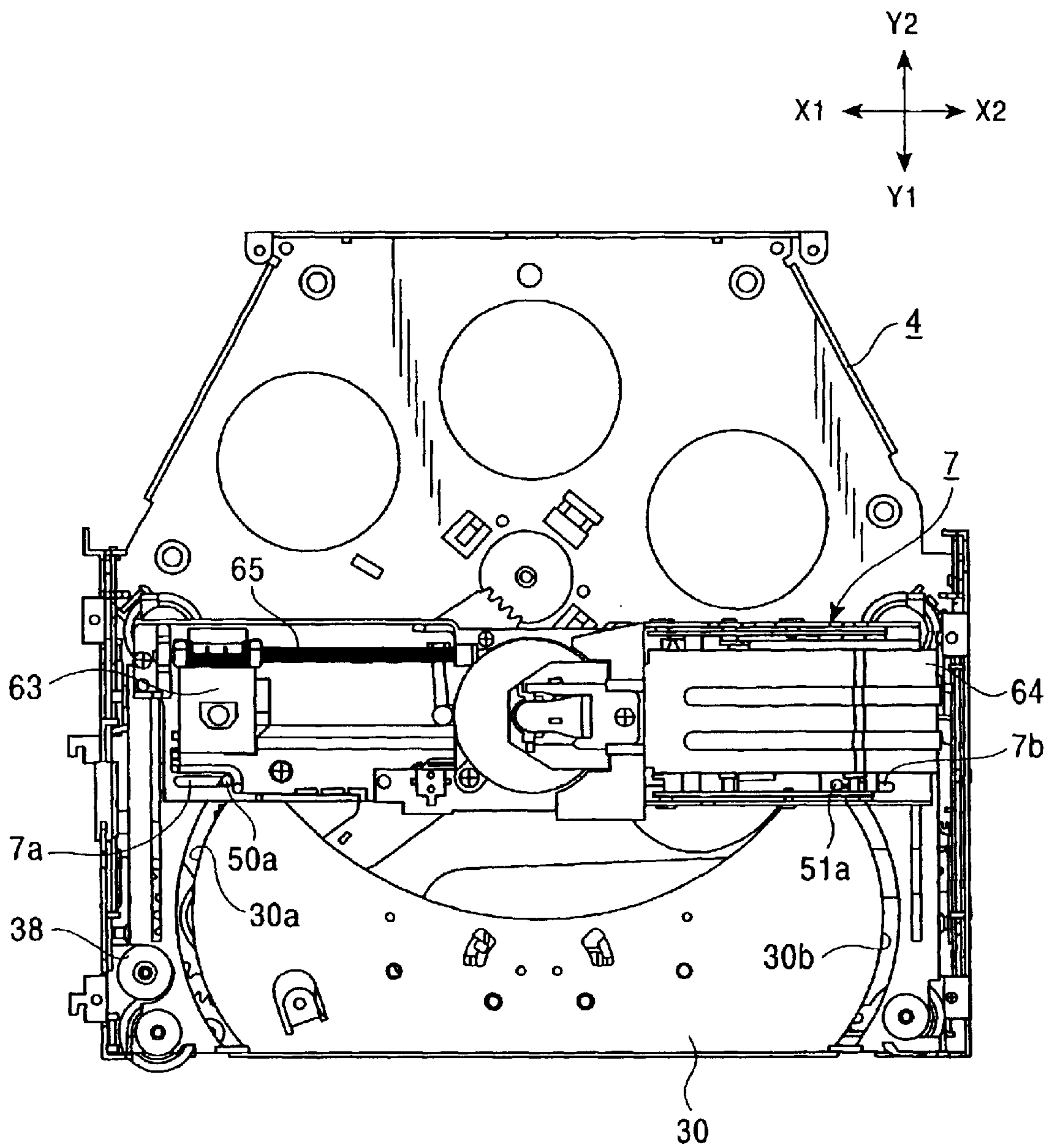
FIG. 16 is a plan view of the internal mechanism of the second chassis.
Figure 17:
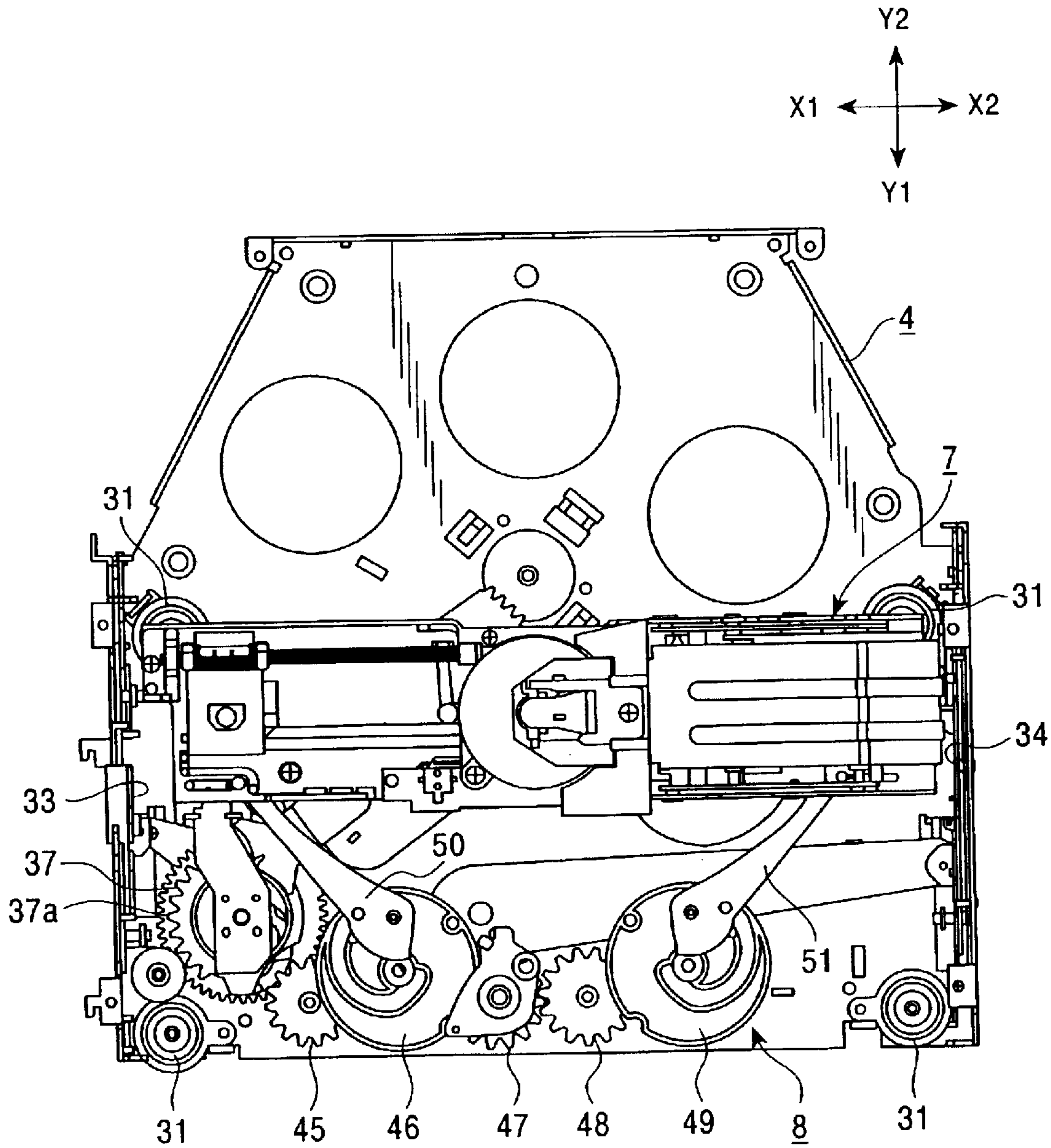
FIG. 17 is a plan view of the internal mechanism of the second chassis with a portion omitted.

Referring to FIGS. 15 to 17, the second chassis 4 mounts the drive unit 7 and the drive activating mechanism 8. The drive activating mechanism 8 moves the drive unit 7 back and forth to the drive position or to the retracted position between the face member 2 and the disk storage section 6, and clamps the disk D taken out to the play position. The drive activating mechanism 8 includes a drive chassis 30, the four corners of which are elastically supported on the second chassis 4 through respective dampers 31 and coil springs (not shown). Lock pins 32 project from four portions on the sides of the drive chassis 30. When the lock pins 32 are locked to the second chassis 4 with a pair of slide cam plates 33 and 34, which will be described later, the drive chassis 30 is fixedly supported on the second chassis 4.

Figure 18:
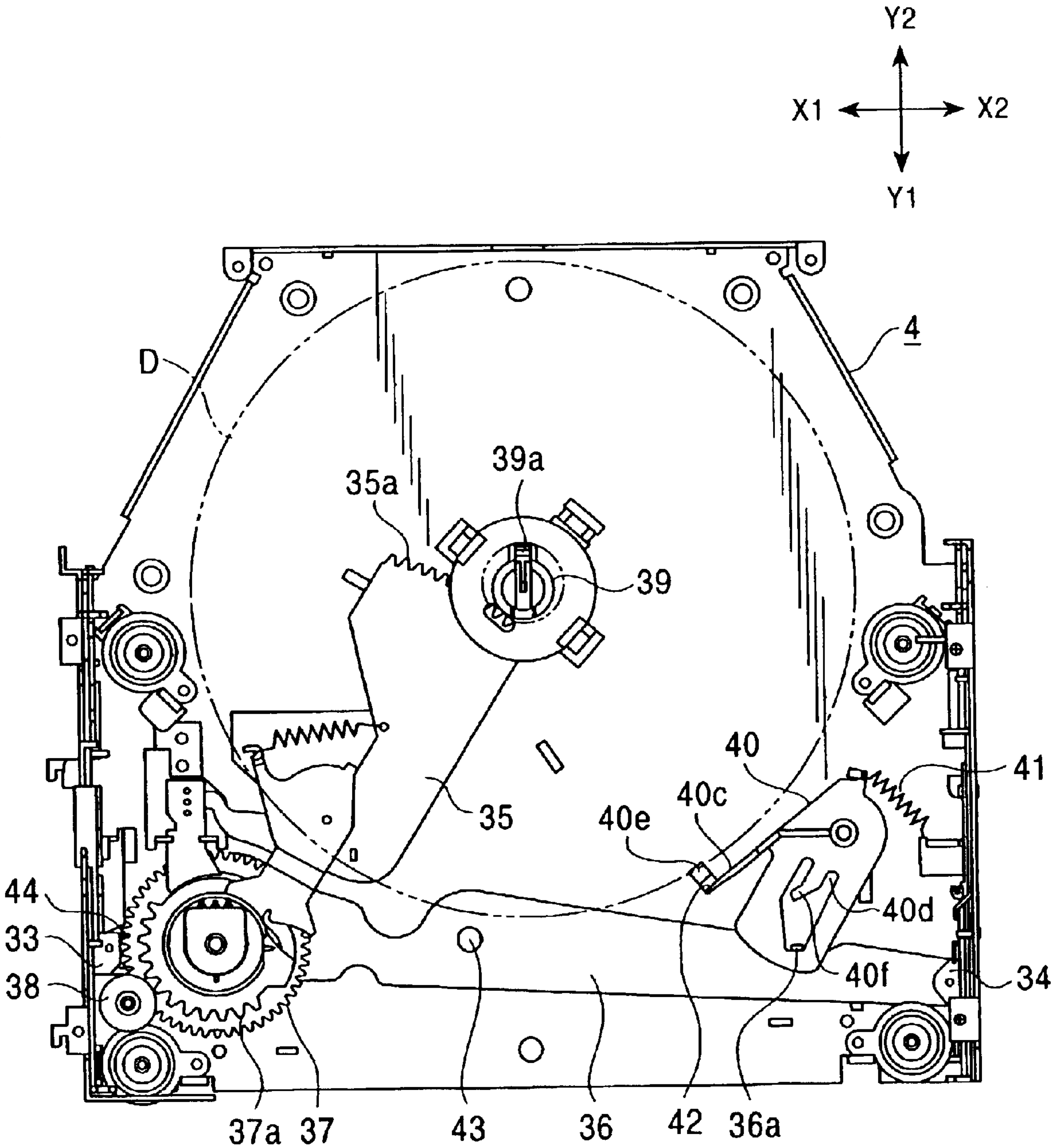
FIG. 18 is a plan view showing a state in which the pressure contact between the second pressing member and the disk is released.
Figure 19:
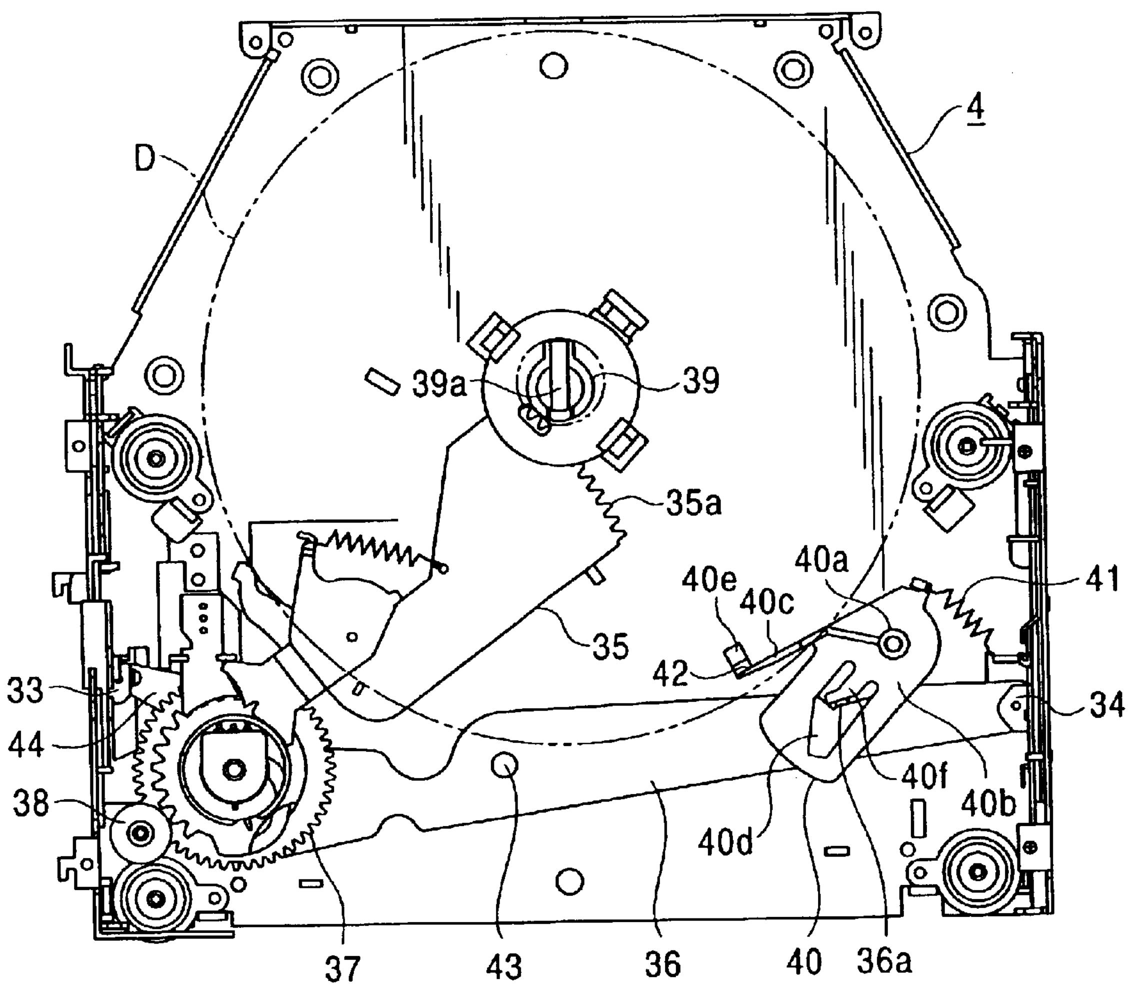
FIG. 19 is a plan view showing a pressure contact state of the second pressing member and the disk.

Referring to FIGS. 18 and 19, the second chassis 4 has an activating arm 35 and a rotating arm 36 disposed on the bottom of the second chassis 4, which are rotated by a snaggletooth gear 37. The snaggletooth gear 37 is in engagement with a relay gear 38. The relay gear 38 is rotated using a third motor (not shown) provided at the first chassis 3 as a drive source. A lower locking member 39 projects from the bottom of the second chassis 4. The lower locking member 39 and the upper locking member 17 provided at the first chassis 3 are arranged coaxially in the vertical direction. The lower locking member 39 has a locking arm 39*a* at the upper end, which is rotated by a switching member (not shown) housed in the lower locking member 39. The lower locking member 39 has a screw shaft (not shown) for moving the switching member up and down therein. A fan-shaped teeth section 35*a* at the end of the activating arm 35 is in engagement with the screw shaft. Accordingly, the locking arm 39*a* rotates at the upper end of the lower locking member 39 with the rotation of the activating arm 35; and when the drive unit 7 is in the retracted position, the locking arm 39*a* stands upright to come into contact with the upper locking member 17, so that the center holes of all the disks D held in the stockers 21 are locked horizontally (in the back-and-forth direction) by the lower locking member 39. On the other hand, when the drive unit 7 is moved to the drive position, the locking arm 39*a* is brought down to ensure a transfer path of the disk D between the upper locking member 17 and the lower locking member 39. Therefore, a desired selected disk D held in the stocker 21 can be taken out to the play position, a new disk D can be inserted into an empty stocker 21, or a disk D can be ejected from the stocker 21 toward the loading slot 2*a*.

A second pressing member 40 is rotatably disposed on the bottom of the second chassis 4. The second pressing member 40 includes a support shaft 40*a* journaled on the second chassis 4, a planar portion 40*b* extending along the bottom of the second chassis 4, a pressing section 40*c* extending and projecting from one side of the planar portion 40*b*, and a sliding piece 40*e* provided at the lower end of the free end of the pressing section 40*c* and sliding on the bottom of the second chassis 4, which are integrally formed of a flexible synthetic resin. A coil spring (biasing member) 41 is provided between the planar portion 40*b* and the second chassis 4. The second pressing member 40 is biased to rotate clockwise in FIGS. 18 and 19 by the coil spring 41. A lock plate 42 is fixed to the free end of the pressing section 40*c* with a double-sided adhesive tape or the like. The lock plate 42 has the same structure as the lock plate 27 fixed to the pressing section 25*c* of the first pressing member 25, a detailed description of which is omitted here. An engagement hole 40*d* is formed in the planar portion 40*b*. A projection 36*a* on the rotating arm 36 projects into the engagement hole 40*d*, and moves in slide contact with the inner peripheral edge (engagement portion) of the engagement hole 40*d*; thus, the second pressing member 40 is rotated in conjunction with the rotation of the rotating arm 36.

The rotating arm 36 can be rotated around a support shaft 43 projecting from the second chassis 4, to one end of which is connected a slide cam plate (sliding member) 34, which is supported on the second chassis 4 such that it can be moved back and forth, and the other end of which is in engagement with a cam groove (not shown) on the back of the snaggletooth gear 37. Another rotating arm 44 is in engagement with a cam groove of the snaggletooth gear 37. A slide cam plate (sliding member) 33, which is similarly supported on the second chassis 4 such that it can be moved back and forth, is connected to the rotating arm 44. The drive unit 7 can be moved back and forth between the drive position and the retracted position by the driving force from the snaggletooth gear 37. The timing of the transfer of the drive unit 7 and the rotation of the rotating arm 36 is provided by the snaggletooth gear 37. The rotating arms 36 and 44 and the snaggletooth gear 37 constitute an interlocking mechanism for moving the slide cam plates 33 and 34 back and forth in synchronization with each other. FIG. 18 shows a state in which the drive unit 7 is in the retracted position. In this case, since the projection 36*a* of the rotating arm 36 is in contact with the inner peripheral edge (engagement portion) of the engagement hole 40*d* at the lower part in the drawing, the second pressing member 40 cannot be rotated and the lock plate 42 fixed to the free end of the pressing section 40*c* is spaced apart from the circumferential edges of the disks D held in the stockers 21. On the other hand, FIG. 19 shows a state in which the drive unit 7 is moved to the drive position. In this case, since the projection 36*a* is moved in the engagement hole 40*d* by the rotation of the rotating arm 36, the second pressing member 40 is slightly rotated clockwise by the coil spring (biasing member) 41, and the lock plate 42 is in pressure contact with the circumferential edges of the disks D under the transfer path of the disk D (under the selected disk D in the play position). Accordingly, when a desired selected disk D is taken out to the play position, the disks D under the selected disk D receive a spring force due to the flexibility of the pressing section 40*c* of the second pressing member 40 and a spring force of the coil spring (biasing member) 41 to be biased toward the stockers 21; thus, rattle noise occurring from the vibration of the waiting disks D held in the stockers 21 is reduced. Accordingly, when a desired selected disk D is taken out to the play position, all the waiting disks D left in the stockers 21 can be locked in position by the first pressing member 25 and the second pressing member 40, thus allowing the rattle noise occurring from the vibration of the waiting disks D to be reduced reliably. Although, in this embodiment, the pressing section 40*c* of the second pressing member 40 is brought into pressure contact with the waiting disks D mainly by the spring force of the coil spring (biasing member) 41, it is also possible to bring the pressing section 40*c* into pressure contact with the circumferential edges of the waiting disks D more strongly by pressing a piece 40*f*, which is formed at the inner peripheral edge of the engagement hole 40*d* of the second pressing member 40.

Returning to FIGS. 15 and 17, the drive activating mechanism 8 will be more specifically described. The drive chassis 30 has a first idler gear 45 engaging with a teeth section 37*a* of the snaggletooth gear 37 for transmitting a driving force, an upstream cam gear 46 engaging with the first idler gear 45 all the time, a second idler gear 47 engaging with the upstream cam gear 46 all the time, a third idler gear 48 engaging with the second idler gear 47 all the time, and a downstream cam gear 49 engaging with the third idler gear 48 all the time, each journaled therein. An upstream arm 50 engageable with a cam groove 46*a* of the upstream cam gear 46 activates one end of the drive unit 7, and a down stream arm 51 engageable with a cam groove 49*a* of the downstream cam gear 49 activates the other end of the drive unit 7. Activating pins 50*a* and 51*a* project from the ends of the arms 50 and 51, respectively. The first activating pin 50*a* extends through an arch-shaped guide hole 30*a* in one side of the drive chassis 30 and a horizontal hole 7*a* in one side of the drive unit 7. Similarly, the second activating pin 51*a* extends through an arch-shaped guide hole 30*b* in the other side of the drive chassis 30 and a horizontal hole 7*b* in the other side of the drive unit 7.

When the first idler gear 45 is in engagement with the teeth section 37*a* of the snaggletooth gear 37, the torque of the snaggletooth gear 37 is transmitted through the gear group to the arms 50 and 51, so that the drive activating mechanism 8 can move the drive unit 7 back and forth on the drive chassis 30. At that time, the torque of the snaggletooth gear 37 is not transmitted to the rotating arms 36 and 44 because of the shape of the cam groove of the snaggletooth gear 37; thus, the rotating arms 36 and 44 stop in the position shown in FIG. 18. On the other hand, when the first idler gear 45 is not in engagement with the teeth section 37*a* of the snaggletooth gear 37, the drive unit 7 does not move back and forth, stopping in the drive position. At that time, the torque of the snaggletooth gear 37 is transmitted to the rotating arms 36 and 44 because of the shape of the cam groove, and the rotating arms 36 and 44 are rotated; thus, a clamping operation and a switching operation to a vibration insulation mode, which will be described later, are performed.

Figure 20A:
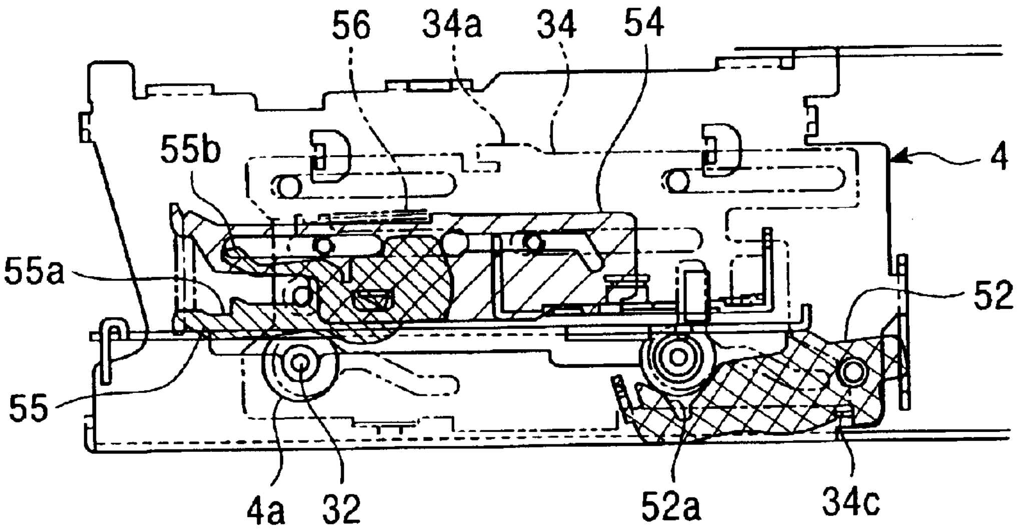
FIGS. 20A to 20D are views illustrating the operation of a drive activating mechanism.

Referring to FIGS. 20A to 20D, an activating plate 52 is rotatably supported inside one side of the second chassis 4. The activating plate 52 is rotated by the back-and-forth motion of the slide cam plate 34. Specifically, a projection 34*c* provided at the lower end of the slide cam plate 34 moves while sliding on the lower edge of the activating plate 52, so that the free end of the activating plate 52 is rotated vertically in the drawing. The slide cam plate 34 has a pair of lock holes 53 at the front and rear portions, each having a cam hole 53*a* and a large-diameter section 53*b*. The lock pins 32 reach respective escape holes 4*a* provided at one side of the second chassis 4 through the lock holes 53. The slide cam plate 33 disposed on the other side of the second chassis 4 has the same structure (not shown). FIGS. 20A to 20D sequentially illustrate how the drive unit 7 moves from the drive position to the retracted position. Referring to FIG. 20A, when the drive unit 7 is in the drive position, the activating plate 52 is rotated downward depending on the position of the projection 34*c* of the slide cam plate 34, and the lock pins 32 reach the respective escape holes 4*a* through the large-diameter sections 53*b* of the lock holes 53, so that the drive chassis 30 is elastically supported on the second chassis 4 through the dampers 31 and the coil springs, in which the playing operation for the selected disk D is performed. When the slide cam plate 34 is moved to the front (left in the drawing) of the second chassis 4 as the drive unit 7 moves from the drive position to the retracted position, the activating plate 52 is rotated upward while sliding on the projection 34*c*; a groove 52*a* at the free end of the activating plate 52 is fitted on the lock pin 32; and the lock pin 32 enters the cam hole 53*a* from the large-diameter section 53*b* of the lock hole 53, and thus the drive chassis 30 is fixedly supported on the second chassis 4 vertically and in the back-and-forth direction. As described above, the pair of slide cam plates 33 and 34, the activating plate 52, and the connecting mechanism constitute a drive locking mechanism for switching the drive unit 7 between a state in which it is elastically supported in the casing 1 through the drive chassis 30 and a state in which it is fixedly supported in the casing 1.

A projection 34*a* and an activating piece 34*b* are provided as bent portions at the upper end of the slide cam plate 34 and at the inner surface on the back, respectively. The projection 34*a* faces the activating section 25*d* of the first pressing member 25 described above (refer to FIGS. 13 and 14). A cam plate 54 and a lock plate 55 are provided in layers on the inner surface of the slide cam plate 34. The cam plate 54 and the lock plate 55 are moved in synchronism with the back-and-forth motion of the slide cam plate 34. A coil spring 56 is placed between the cam plate 54 and the slide cam plate 34. The cam plate 54 is biased ahead of the slide cam plate 34 (left in the drawing) by the coil spring 56. The cam plate 54 has a guide hole 54*a* engageable with a pin 57 on the side of the second chassis 4 and has an activating piece 54*b* provided as a bent portion at the lower end of the back. The lock plate 55 is supported on the cam plate 54 such that it can oscillate, and a coil spring 58 is disposed between the lock plate 55 and the cam plate 54. The lock plate 55 has a lock groove 55*a*, which can be engaged with and disengaged from a pin 59 on the slide cam plate 34, and has a cam 55*b*, which can be engaged with and disengaged from the pin 57, at the upper end.

The structure of the drive unit 7 will be described. Referring to FIGS. 21A and 21B and FIGS. 22A and 22B, the drive unit 7 has a horizontal bracket 60 placed on the drive chassis 30 such that it can freely be moved back and forth, in which the horizontal holes 7*a* and 7*b* are provide. A spindle motor 61 is mounted at the center of the bracket 60. A turntable 62 is firmly fixed to the rotation shaft of the spindle motor 61. The bracket 60 also has an optical pickup 63 and a support plate 64 arranged to face each other across the spindle motor 61. The optical pickup 63 is in engagement with a screw shaft 65. The optical pickup 63 is moved in the axial direction of the screw shaft 65 (in the radial direction of the disk D) by rotating the screw shaft 65 using a thread motor (not shown) as a drive source.

Figure 13:
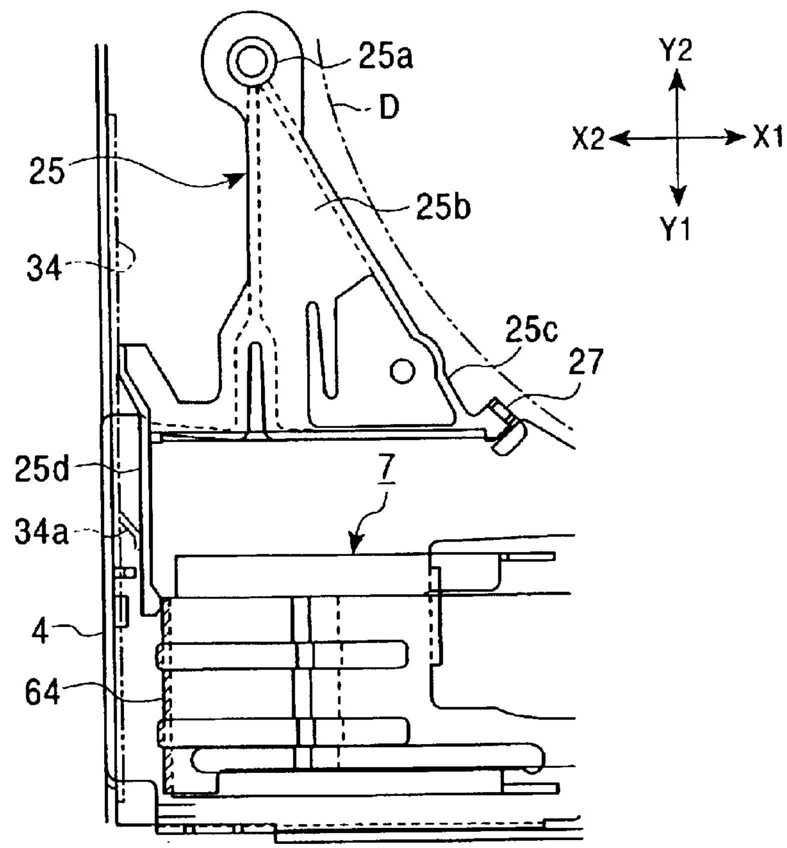
FIG. 13 is a bottom view showing a state in which the pressure contact between the first pressing member and the disk is released.
Figure 14:
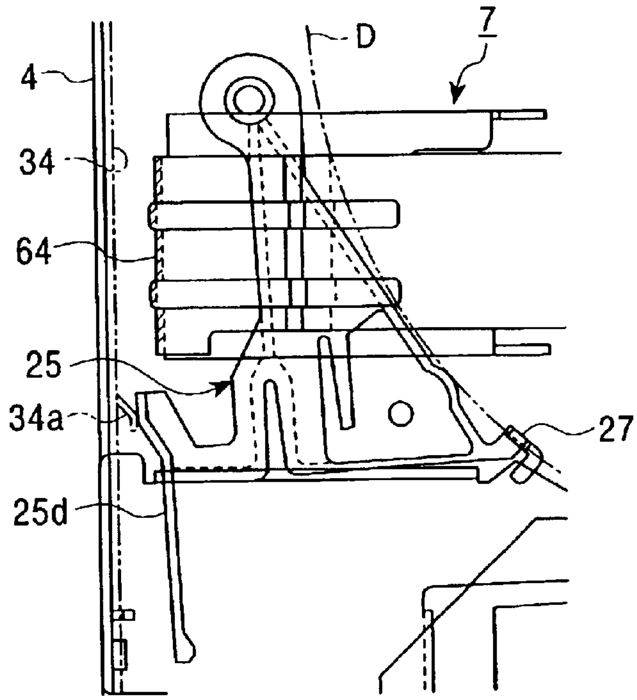
FIG. 14 is a bottom view showing a pressure contact state of the first pressing member and the disk.

The support plate 64 is formed with a partial U shape, and moves back and forth inside the activating section 25*d* of the first pressing member 25 (refer to FIGS. 13 and 14). A damper 66 is rotatably supported at the upper end of the support plate 64. The disk D is chucked between the damper 66 and the turntable 62. Four pins 64*a* are provided on lower opposite sides of the support plate 64, and extend through respective cam holes 67*a* in the slide plate 67 and respective vertically holes 60*a* in the bracket 60. The slide plate 67 is placed on the bracket 60. Four pins 67*b* on opposite sides of the slide plate 67 extend through horizontal holes 64*b* provided in the bracket 60. An activating plate 68 is rotatably supported on the lower surface of the bracket 60. The slide plate 67 is moved horizontally (in the right-and-left directions) on the bracket 60 by the rotation of the activating plate 68. A reversing spring 69 is engaged between the slide plate 67 and the activating plate 68. The slide plate 67 is stably held at opposite ends in the transfer direction by the biasing force of the reversing spring 69. Also, an activating pin 68*a* is provided at one end of the activating plate 68. The activating pin 68*a* projects toward the slide cam plate 34 and the cam plate 54.

Figure 20B:
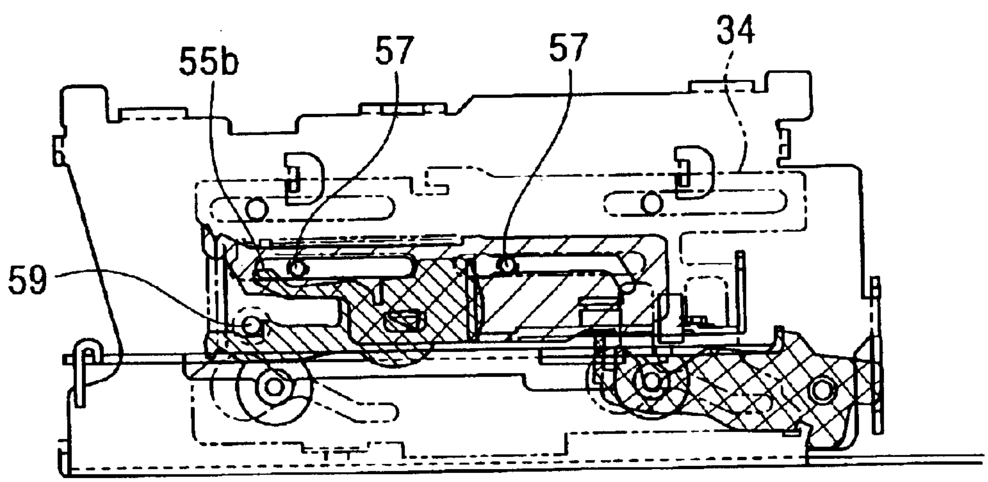

The clamping operation for the disk D will be described also with reference to FIGS. 20A to 20D. When the slide cam plate 34 is in the hithermost (left in the drawing) of the second chassis 4 as shown in FIG. 20D, the drive unit 7 is in the retracted position, and as shown in FIG. 21B, the damper 66 is in a clamp release state in which the damper 66 is spaced apart from the turntable 62. At that time, the lock groove 55a of the lock plate 55 is locked with the pin 59 of the slide cam plate 34, and the activating piece 34b of the slide cam plate 34 and the activating piece 54b of the cam plate 54 face each other with the positions displaced back and forth. When the drive unit 7 is moved from the retracted position to the drive position, the activating pin 68a of the activating plate 68 passes directly under the activating piece 54b of the cam plate 54 and faces the activating piece 34b of the slide cam plate 34; however, the clamp release state is maintained.

Figure 20C:
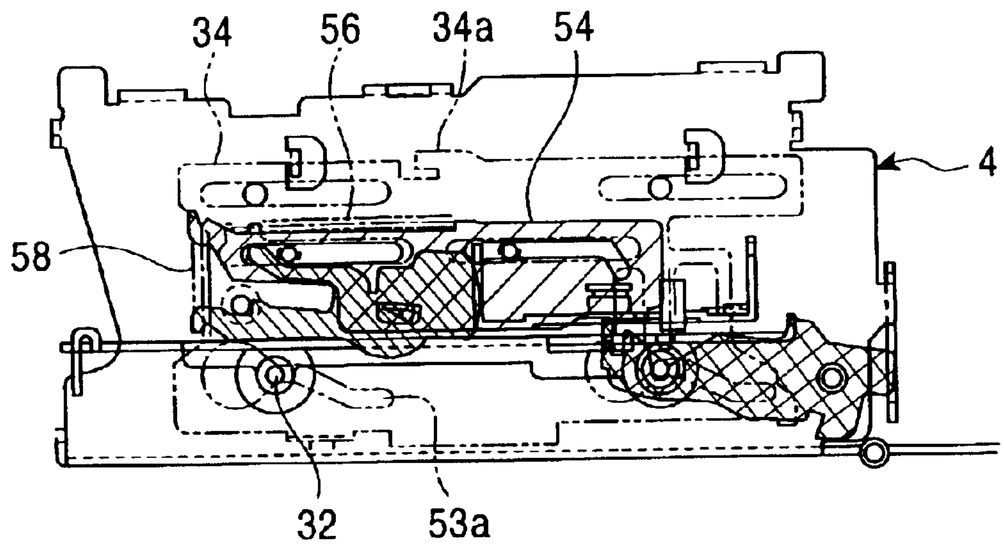
Figure 20D:
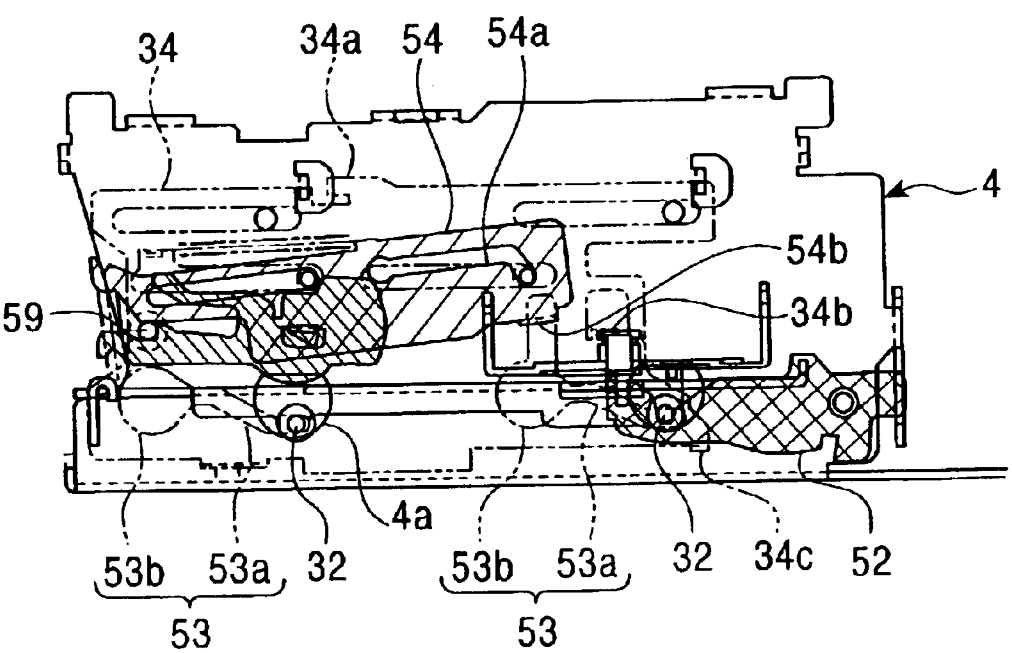
Figure 21A:
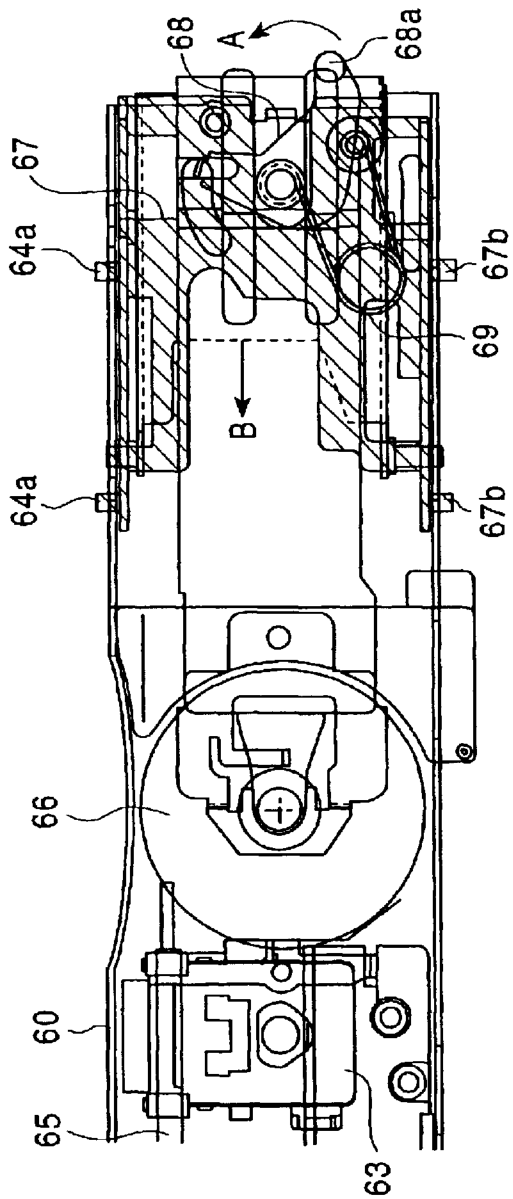
FIGS. 21A and 21B show a clamp released state of a drive unit, FIG. 21A being a plan view thereof and FIG. 21B being a side view thereof.
Figure 21B:
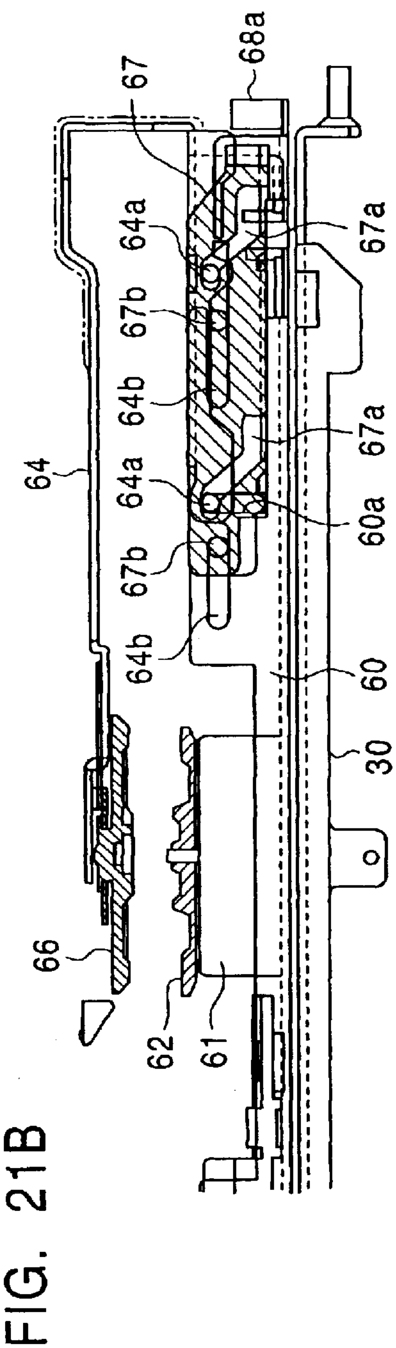
Figure 22A:
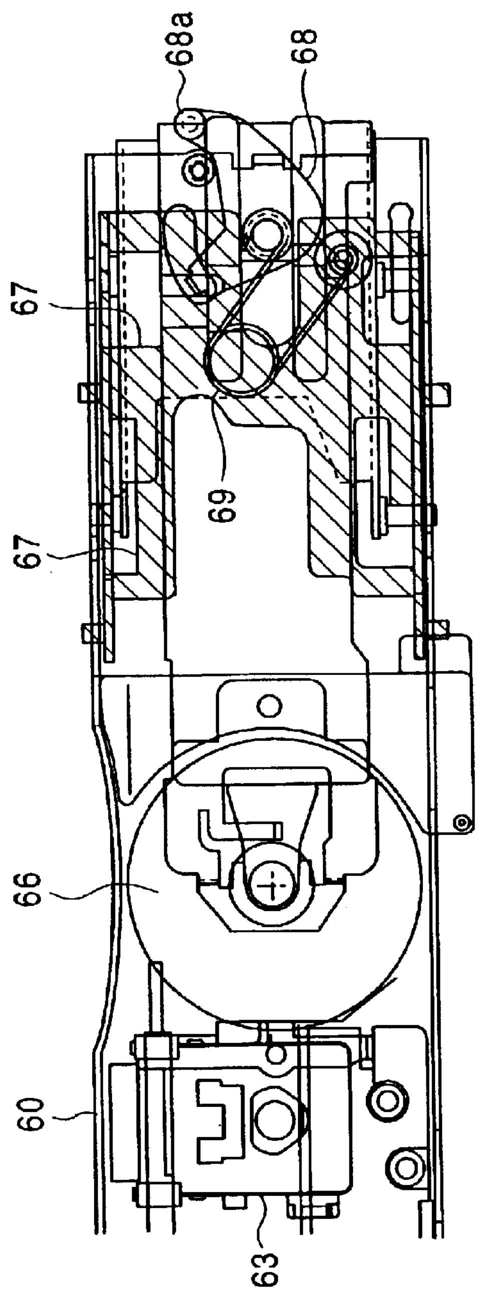
FIGS. 22A and 22B show a clamped state of the drive unit, FIG. 22A being a plan view thereof and FIG. 22B being a side view thereof.
Figure 22B:
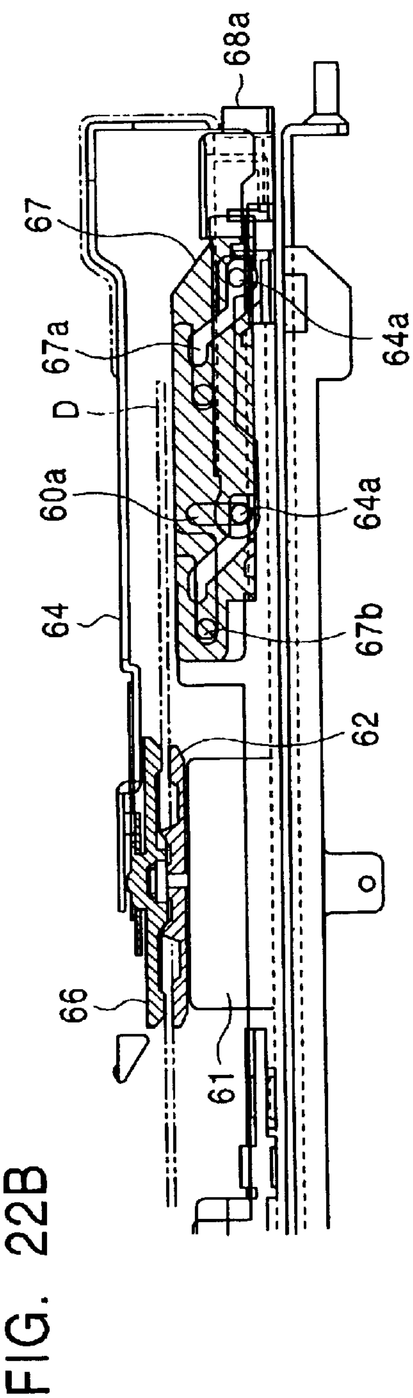

When the slide cam plate 34 is moved to the back of the second chassis 4 after the drive unit 7 has been moved to the drive position, the lock pins 32 each move from the lower part to the upper part of the cam hole 53a, as shown in FIG. 20C, so that the drive chassis 30 is moved upward along with the drive unit 7. Also, the lock groove 55a of the lock plate 55 is retained on the pin 59 of the slide cam plate 34, so that the cam plate 54 moving toward the back along with the slide cam plate 34 is slightly rotated clockwise in the drawing by the engagement between the guide hole 54a and the pin 57, and moves toward the back of the second chassis 4 while maintaining the horizontal position; thus, the activating piece 54b of the cam plate 54 presses the activating pin 68a of the activating plate 68 during the movement. Therefore, the activating plate 68 is rotated in the direction shown by arrow A in FIG. 21A to move the slide plate 67 in the direction shown by arrow B, so that the support plate 64 moves downward along with the damper 66, as shown in FIG. 22B, into a clamp state in which the damper 66 is in pressure contact with the turntable 62 through the disk D.

When the slide cam plate 34 is moved further toward the back of the second chassis 4, the upper surface of the cam 55b of the lock plate 55 is brought into contact with the pin 57 and is rotated downward; thus, the lock groove 55a of the lock plate 55 is disengaged from the pin 59. Consequently, as shown in FIG. 20A, the cam plate 54 and the lock plate 55 are moved to the left in the drawing by the spring force of the coil spring 56; thus, the respective activating pieces 34b and 54b of the slide cam plate 34 and the cam plate 54 are separated sufficiently from the activating pin 68a. As described above, in this case, the drive chassis 30 having the drive unit 7 is elastically supported by the second chassis 4, and in this position, a selected disk D is played.

Next, the operation of the changer-type disk device with the above construction will be described. As described above, the changer-type disk device according to this embodiment is a disk playback device capable of playing back a disk D having an external diameter of 8 cm (small-diameter disk) and a disk D having an external diameter of 12 cm (large-diameter disk). Here, the operation of selectively playing back a plurality of large-diameter disks D housed in the stockers 21 will be described.

When a desired selected disk D among the plurality of disks D held in the stockers 21 is played back, the drive unit 7 is first moved to a retracted position (refer to FIG. 11) farthest from the stockers 21, and in this state, the large-diameter gear 16 is rotated to move the stocker 21 that holds the desired selected disk D up or down to the same height as the transfer path of the disk D. At that time, as shown in FIG. 13, since the outer surface of the support plate 64 of the drive unit 7 is in contact with the end of the activating section 25d of the first pressing member 25, the first pressing member 25 is held in position in a state of being rotated clockwise in the drawing, and the disks D held in the stockers 21 are released from the pressure of the first pressing member 25. Also, as shown in FIG. 18, since the rotating arm 36 locks the rotation of the second pressing member 40 against the biasing force of the coil spring 41 (biasing member), the disks D held in the stockers 21 are released from the pressure of the second pressing member 40. Accordingly, all the disks D held in the stockers 21 can be moved up and down without interference with the first and second pressing members 25 and 40.

Figure 4:
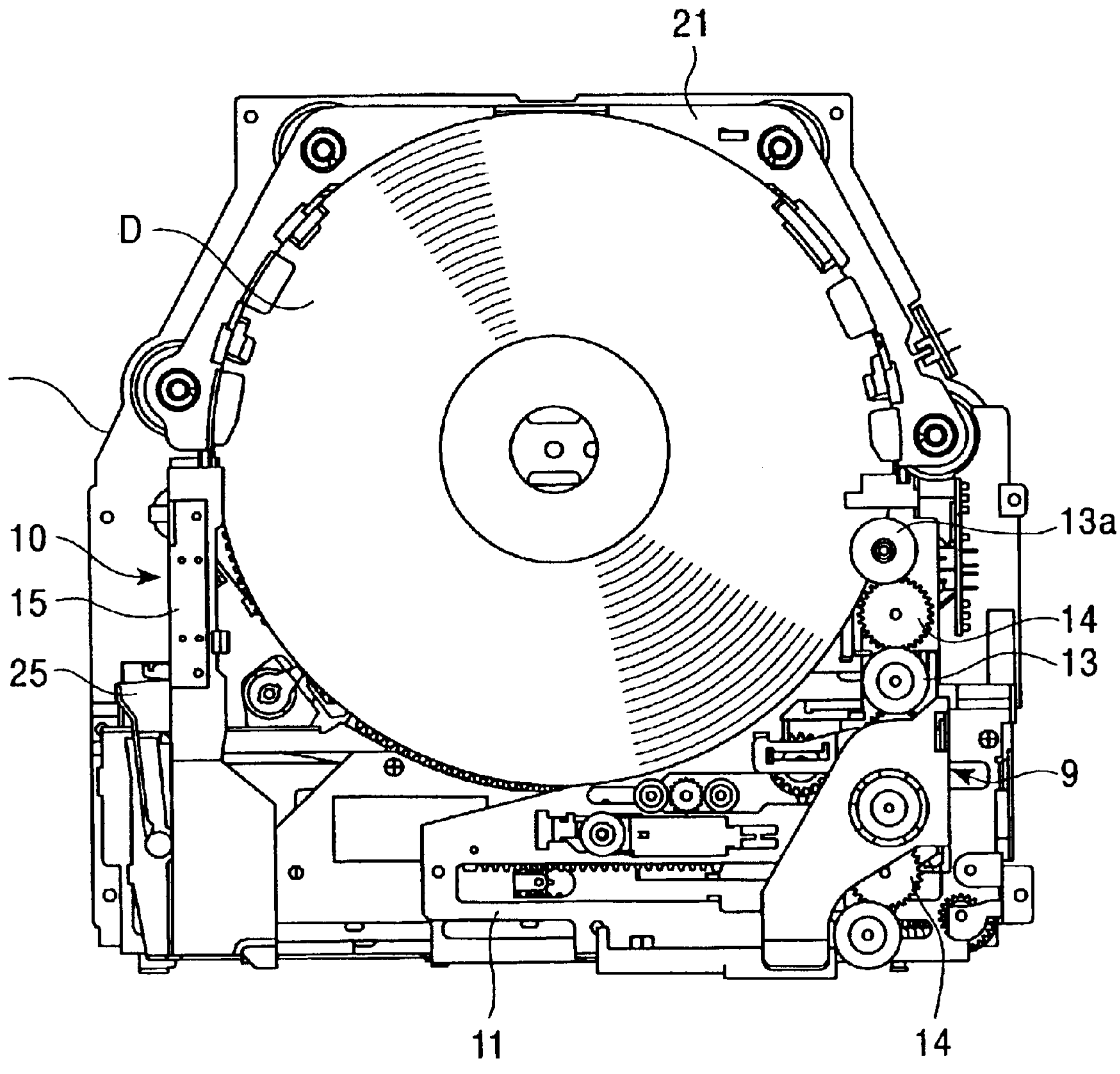
FIG. 4 is a bottom view showing a state in which the disk is housed.
Figure 5:
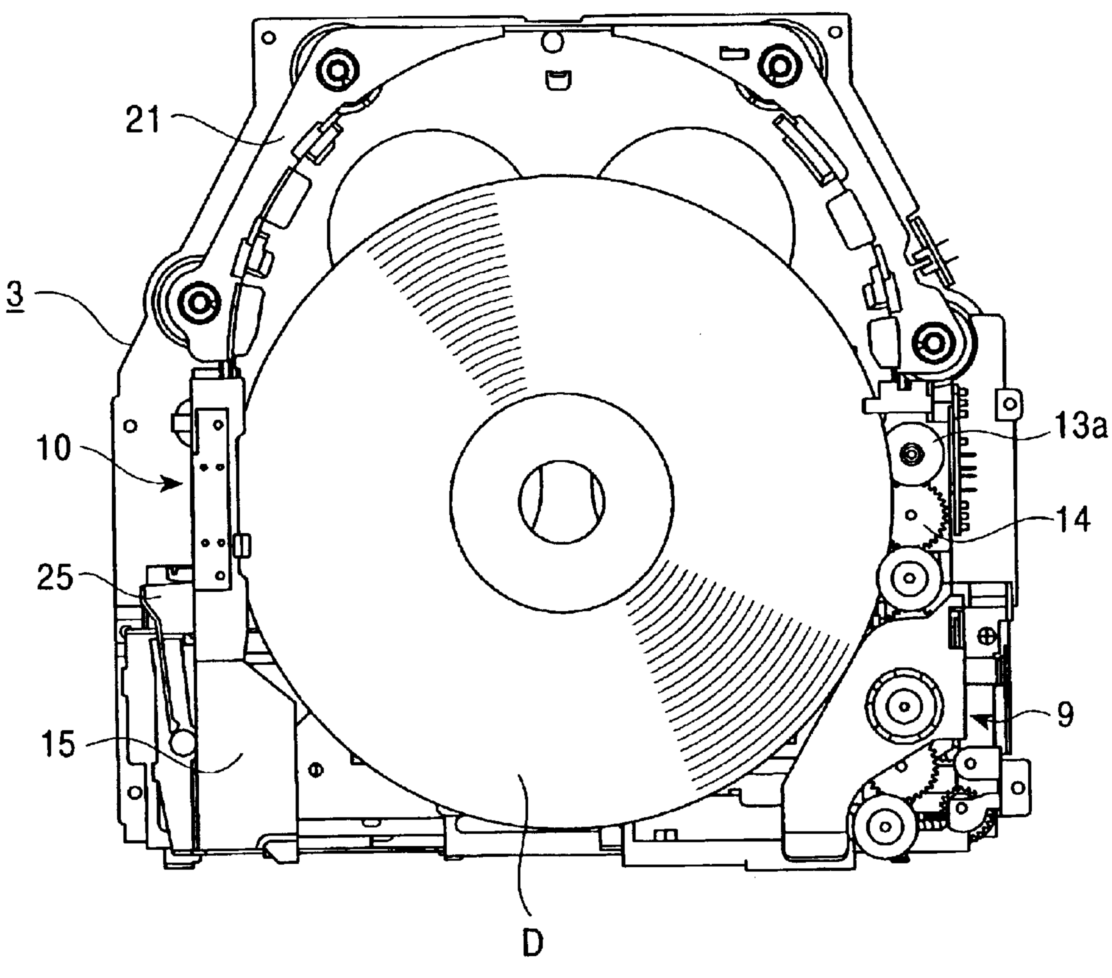
FIG. 5 is a bottom view showing a state in which the disk is being removed.

Next, the snaggletooth gear 37 is rotated counterclockwise in FIG. 18 using the third motor (not shown) as a drive source, and the torque of the snaggletooth gear 37 is transmitted to the arms 50 and 51 through the gear group including the first idler gear 45, which is in engagement with the teeth section 37a, thereby moving the drive unit 7 from the retracted position to the drive position (FIG. 12). Thereafter, the first motor is rotated to drive the guide-distance changing mechanism including the slide plates 11 and 12, thereby moving the first and second guides 9 and 10 in the direction to come closer to each other. As shown in FIG. 4, the selected desired disk D is sandwiched between the transfer pulleys 13 and the transfer guide 15, and in this state, the innermost transfer pulley 13a is rotated, so that the selected disk D is taken out to a play position where it can be driven by the drive unit 7, as shown in FIG. 5. Whether or not the selected disk D is taken out to the play position is sensed by pushing a switch (not shown) mounted in the guide groove of the transfer guide 15 to the circumferential edge of the disk D.

The teeth section 37a of the snaggletooth gear 37 and the first idler gear 45 are brought out of engagement with each other when the drive unit 7 has been moved to the drive position, and the rotating arms 36 and 44 are rotated with the further rotation of the snaggletooth gear 37; therefore, the slide cam plates 33 and 34 move from this side toward the back on the inner surface of the second chassis 4. Here, the drive chassis 30 mounting the drive unit 7 moves upward while the slide cam plate 34 moves from the position shown in FIG. 20D to the position shown in FIG. 20C, so that the center of the turntable 62 enters the center hole of the selected disk D taken out to the play position, thereby ensuring the centering operation for the selected disk D. Also, since the activating piece 54b of the cam plate 54 presses the activating pin 68a to rotate the activating plate 68, a clamping operation is performed in which the damper 66 moves downward along with the support plate 64, and the selected disk D centered on the turntable 62 is press-fitted with the damper 66. After the selected disk D has been chucked on the turntable 62, the transfer pulleys 13 and the transfer guide 15 are moved to the most separated positions from each other, so that the selected disk D taken out to the play position, as shown in FIG. 6, can be rotated freely.

When the slide cam plate 34 moves from the position shown in FIG. 20C through the position shown in FIG. 20B to the position shown in FIG. 20A, the drive locking mechanism releases the lock mode in which the drive chassis 30 is fixedly supported on the second chassis 4, and switches to the vibration insulation mode in which it is elastically supported by the dampers 31 and so on. The drive unit 7 mounted on the drive chassis 30 operates to play back the selected disk D taken out to the play position in the vibration insulation mode. As the drive unit 7 moves from the retracted position to the drive position, the support plate 64 of the drive unit 7 is separated from the activating section 25d of the first pressing member 25, and the projection 34a positioned on the outside of the activating section 25d presses the side edge of the first pressing member 25 with the movement of the slide cam plate 34, as shown in FIG. 14. Accordingly, the first pressing member 25 is slightly rotated counterclockwise to bring the lock plate 27 into pressure contact with the circumferential edges of all of the waiting disks D above the selected disk D taken out to the play position. As shown in FIG. 19, since the second pressing member 40 is slightly rotated clockwise by the spring force of the coil spring (biasing member) 41, the lock plate 42 firmly fixed to the second pressing member 40 is brought into pressure contact with the circumferential edges of all the waiting disks D under the selected disk D taken out to the play position. Therefore, when the selected disk D is taken out to the play position, all the waiting disks D left in the stockers 21 can be pushed in the radial direction (toward the stockers 21) by the first and second pressing members 25 and 40 and locked in position; thus, the rattle noise occurring due to the vibration of the waiting disks D can be reduced.

In this embodiment, the disk storage section 6 includes six stockers 21, wherein when a disk D held in the third stocker 21 is selected and taken out to the play position, two waiting disks D held in the first and second layers of stockers 21 are locked in position by the first pressing member 25, and three waiting disks D held in the fourth, fifth, and sixth layers of the stockers 21 are locked in position by the second pressing member 40. At that time, a smaller number of tapered grooves 27*a* than the stockers 21 are formed in the lock plate 27 of the first pressing member 25; the distance between the tapered grooves 27 is set equal to the regular pitch at the upper and lower ends of the spiral grooves 19*a* of the lead screws 19; and the lock plate 42 of the second pressing member 40 is constructed similarly. Therefore, all the waiting disks D left in the stockers 21 can be locked in position in the radial direction and the thickness direction, thereby ensuring the reduction of rattle noise.

When the selected disk D taken out to the play position is housed in the stocker 21, first, the snaggletooth gear 37 is rotated inversely from the above description, thereby moving the arms 36 and 44 and the slide cam plates 33 and 34 from the position shown in FIG. 19 to the position shown in FIG. 18. While the slide cam plate 34 is moved from the position shown in FIG. 20A to the position shown in FIG. 20D, the clamp release operation and the operation of shifting from the vibration insulation mode to the lock mode are performed, the transfer pulleys 13 and the transfer guide 15 are brought closer to each other, and the innermost transfer pulley 13*a* is rotated backward. Thus, the selected disk D taken out to the play position is returned to an empty stocker 21. When the snaggletooth gear 37 is further rotated backward to engage the teeth section 37*a* with the first idler gear 45, the torque of the snaggletooth gear 37 is transmitted to the arms 50 and 51. Therefore, the drive unit 7 is moved from the drive position to the retracted position; thus, the disks D held in the stockers 21 are released from the pressure of the first and second pressing members 25 and 40.

In the above embodiment, the lock plates 27 and 42 are firmly fixed to the first and second pressing members 25 and 40, respectively, and the lock plates 27 and 42 are brought into pressure contact with the circumferential edges of the disks D held in the stockers 21. However, the lock plates 27 and 42 may not necessarily be provided, but the pressing sections 25*c* and 40*c* of the pressing members 25 and 40 may be directly brought into pressure contact with the disks D. In this case, it is also possible to provide the tapered grooves from the lock plates 27 and 42 in the pressing sections 25*c* and 40*c*. Also, the shapes and materials of the pressing members 25 and 40 may be changed as appropriate, and need only be able to press and bias the circumferential edges of the disks D held in the stockers 21 from the loading slot 2*a* toward the stockers 21 when the drive unit 7 is moved from the retracted position to the drive position.

The present invention is embodied as described above, and has the following advantages.

When the drive unit is moved to the drive position and a desired selected disk is played, the waiting disks left in the disk storage section are pressed in the radial direction by the pressing members. Therefore, the rattle noise occurring by the vibration of the waiting disks left in the disk storage section during play can be reduced. Also, when the drive unit is moved to the retracted position with the drive activating mechanism, the pressing members are separated from the circumferential edges of the disks with the action of the drive activating mechanism. Therefore, when the disk is inserted in the disk storage section or when the disk housed in the disk storage section is selected, the motion of the disk can be prevented from being obstructed by the pressing member.

What is claimed is:

1. A changer-type disk device comprising:

a disk storage section holding a plurality of disks arranged in the axial direction of the disks;

a drive unit for reproducing and/or recording information from/on a disk selected from the plurality of disk in the disk storage section;

a drive activating mechanism for moving the drive unit back and forth between a drive position where said selected disk is driven for reproducing and/or recording information from/on the disk and a retracted position where no disk is driven; and a pressing member; wherein when said drive unit is moved to the drive position, said pressing member is brought into pressure contact with the circumferential edges of non-selected disks, which are held in said disk storage section; and said pressing member is separated from the circumferential edges of said non-selected disks when said drive unit is moved from the drive position to the retracted position.

2. A changer-type disk device according to claim 1, wherein a plurality of tapered grooves is provided in a face of said pressing member which faces the circumferential edges of said non-selected disks; wherein said non-selected disks are locked in position by bringing the tapered grooves into pressure contact with the circumferential edges of the non-selected disks left in said disk storage section when said drive unit is moved to the drive position.

3. A changer-type disk device according to claim 1, wherein said pressing member is made of a synthetic resin and flexibly incorporates a pressing section to be brought into pressure contact with the circumferential edges of said non-selected disks.

4. A changer-type disk device according to claim 1, further comprising a disk transfer mechanism for taking out said selected disk from said disk storage section to a play position where it can be driven with the drive unit in said drive position.

5. A changer-type disk device according to claim 4, wherein said disk storage section includes a plurality of stockers for holding the disks and a stocker drive mechanism for moving the stockers up and down in the axial direction of the disks; wherein said disk transfer mechanism takes out said selected disk from said stockers in a predetermined upward or downward position.

6. A changer-type disk device according to claim 5, wherein said stocker drive mechanism includes a plurality of lead screws each having an irregular-pitch spiral groove, and a drive gear for rotating the lead screws synchronously; wherein said stockers are moved up and down in the axial direction of said lead screws in engagement with said spiral groove.

7. A changer-type disk device according to claim 5, wherein said pressing member includes a first pressing member capable of being brought into and out of contact with the circumferential edges of the non-selected disks held in said stockers positioned on one side of said selected disk in the axial direction of the disks; and a second pressing member capable of being brought into and out of contact with the circumferential edges of the non-selected disks held in said stockers positioned on the other side of said selected disk; wherein said first and second pressing members are brought into pressure contact with the circumferential edges of all the non-selected disks left in said stockers when said drive unit is moved to the drive position.

8. A changer-type disk device according to claim 7, wherein said first pressing member includes an activating section engageable with said drive unit; wherein said activating section is brought into engagement with said drive unit to place said first pressing member in position to be spaced apart from said non-selected disks when said drive unit is in said retracted position.

9. A changer-type disk device according to claim 7, wherein said second pressing member includes an engaging section engageable with said drive activating mechanism; wherein said engaging section is brought into engagement with said drive activating mechanism to separate said second pressing member from said non-selected disks when said drive unit is moved from the drive position to the retracted position with said drive activating mechanism.

10. A changer-type disk device according to claim 8, wherein said first pressing member is made of a flexible synthetic resin, and flexibly incorporates a pressing section to be brought into pressure contact with the circumferential edges of said non-selected disks; wherein said pressing section includes a leaf spring, so that a spring force of said leaf spring is added to an elastic force due to the flexibility of said pressing section itself.

11. A changer-type disk device according to claim 9, wherein said second pressing member is biased by a biasing member in the direction to be brought into pressure contact with the circumferential edges of said non-selected disks; wherein said second pressing member is separated from said non-selected disks against the biasing force of said biasing member by a moving force when said drive unit moves from the drive position to the retracted position.

12. A changer-type disk device comprising:

a casing;

a face member having a loading slot through which disks are loaded into and ejected from the casing and arranged on the front of said casing;

a disk storage section arranged at the back of said casing for holding a plurality of disks arranged in the axial direction of the disks;

a disk transfer mechanism for transferring the disks between said loading slot and said disk storage section;

a drive unit movably arranged between said face member and said disk storage section for reproducing and/or recording information from/on a selected disk taken out from said disk storage section to a play position with said disk transfer mechanism;

a drive activating mechanism for moving the drive unit back and forth between a drive position where said selected disk is taken out to said play position and a retracted position where no disk is driven; and a pressing member; wherein when said drive unit is moved to the drive position, said pressing member is brought into pressure contact with the circumferential edges of non-selected disks, which are held in said disk storage section, to press the non-selected disks toward said disk storage section from the outside in the radial direction; and when said drive unit is moved from the drive position to the retracted position, said pressing member is separated from the circumferential edges of said non-selected disks.

13. A changer-type disk device according to claim 12, wherein a plurality of tapered grooves is provided in a face of said pressing member which faces the circumferential edges of said non-selected disks; wherein said non-selected disks are locked in position by bringing the tapered grooves into pressure contact with the circumferential edges of the non-selected disks left in said disk storage section when said drive unit is moved to the drive position.

14. A changer-type disk device according to claim 12, wherein said pressing member is made of a synthetic resin and flexibly incorporates a pressing section to be brought into pressure contact with the circumferential edges of said non-selected disks.

15. A changer-type disk device according to claim 12, wherein said drive activating mechanism includes a drive locking mechanism for switching between a state in which said drive unit is elastically supported in said casing through a damper and a state in which said drive unit is fixedly supported in said casing; wherein said drive locking mechanism shifts said pressing member between a position where said pressing member is brought into contact with said non-selected disks and a position where said pressing member is separated from said non-selected disks.

16. A changer-type disk device according to claim 15, wherein said disk storage section includes a plurality of stockers for holding the disks and a stocker drive mechanism for moving the stockers up and down in the axial direction of the disks; wherein said disk transfer mechanism takes out said selected disk from said stockers in a predetermined upward or downward position.

17. A changer-type disk device according to claim 16, wherein said pressing member includes a first pressing member capable of being brought into and out of contact with the circumferential edges of the non-selected disks held in said stockers positioned on one side of said selected disk in the axial direction of the disks; and a second pressing member capable of being brought into and out of contact with the circumferential edges of the non-selected disks held in said stockers positioned on the other side of said selected disk; wherein said first and second pressing members are brought into pressure contact with the circumferential edges of all the non-selected disks left in said stockers when said drive unit is moved to the drive position.

18. A changer-type disk device according to claim 17, wherein said casing is formed of a first and a second chassis; wherein said first chassis includes said stocker drive mechanism and said first pressing member; and said second chassis includes said drive activating mechanism and said second pressing member.

19. A changer-type disk device according to claim 17, wherein said drive locking mechanism includes a pair of slide members supported in said casing so as to be moved back and forth and a connecting mechanism for moving both slide members back and forth in synchronism, and switches between a state in which said drive unit is elastically supported in said casing when said slide members are moved in one of the backward or forward directions and a state in which said drive unit is fixedly supported in said casing when said slide members are moved in the other direction; wherein said first and second pressing members are connected to one of said slide members and said connecting mechanism, move in the direction to be brought into pressure contact with said non-selected disks with the movement of said slide members in said direction, and move in the direction to be separated from said non-selected disks with the movement of said slide members in the other direction.

20. A changer-type disk device according to claim 19, wherein said connecting mechanism includes a rotating arm rotatably supported in said casing and connected to said slide members; wherein said slide members are moved back and forth by the rotation of said rotating arm; and at least one of said first and second pressing members is moved in engagement with the rotating arm.

* * * * *